(12) United States Patent
Ohhashi et al.

(10) Patent No.: US 8,878,832 B2
(45) Date of Patent: Nov. 4, 2014

(54) PIXEL CIRCUIT, DISPLAY DEVICE, AND METHOD FOR DRIVING DISPLAY DEVICE

(75) Inventors: Seiji Ohhashi, Osaka (JP); Tsuyoshi Kamada, Osaka (JP); Tetsuya Ide, Osaka (JP); Shohei Katsuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 346 days.

(21) Appl. No.: 13/515,087

(22) PCT Filed: Aug. 31, 2010

(86) PCT No.: PCT/JP2010/064820
§ 371 (c)(1),
(2), (4) Date: Jun. 11, 2012

(87) PCT Pub. No.: WO2011/074291
PCT Pub. Date: Jun. 23, 2011

(65) Prior Publication Data
US 2012/0249512 A1    Oct. 4, 2012

(30) Foreign Application Priority Data
Dec. 14, 2009   (JP) .................. 2009-283225

(51) Int. Cl.
*G06F 3/038*   (2013.01)
*G09G 3/36*    (2006.01)
*G02F 1/1343*  (2006.01)

(52) U.S. Cl.
CPC .. *G09G 3/3659* (2013.01); *G02F 2001/134345* (2013.01); *G09G 2300/0447* (2013.01); *G09G 3/3655* (2013.01); *G09G 2300/0876* (2013.01); *G09G 2320/0209* (2013.01)
USPC ............. 345/211; 345/214; 345/694; 345/82; 345/83; 345/204; 349/48; 349/29; 349/144; 315/169.3

(58) Field of Classification Search
USPC ........ 349/48, 39, 129, 144; 345/211, 694, 82, 345/83, 72, 76, 77, 204; 315/169.3; 313/463
See application file for complete search history.

(56) References Cited

U.S. PATENT DOCUMENTS

2004/0070713 A1   4/2004   Song
2006/0215066 A1   9/2006   Ueda et al.
(Continued)

FOREIGN PATENT DOCUMENTS

JP   2004-38165 A    2/2004
JP   2006-133577 A   5/2006
(Continued)

OTHER PUBLICATIONS

Official Communication issued in International Patent Application No. PCT/JP2010/064820, mailed on Oct. 19, 2010.

*Primary Examiner* — Shaheda Abdin
(74) *Attorney, Agent, or Firm* — Keating & Bennett, LLP

(57) ABSTRACT

Provided is a pixel circuit which includes a plurality of subpixel circuits and which makes it possible to suppress overshooting of electric potentials of the subpixel circuits to a small level. A pixel circuit (PIX1) includes a first subpixel circuit (PIXA) and a second subpixel circuit (PIXB). The first subpixel circuit (PIXA) includes a first display element (ClcA), a first node (nA), a first external connection terminal (P1), and a first switching element (T1). The second subpixel circuit (PIXB) includes a second display element (ClcB), a second node (nB), a second external connection terminal (P2), a third external connection terminal (P3), a second switching element (T2), and a third switching element (T3). The first node (nA) and the second node (nB) are connected to each other via a first capacitor (C2).

16 Claims, 23 Drawing Sheets

(56) References Cited

U.S. PATENT DOCUMENTS

| | | | |
|---|---|---|---|
| 2007/0126940 A1* | 6/2007 | Lee | 349/38 |
| 2008/0278424 A1 | 11/2008 | Kim et al. | |
| 2008/0297676 A1* | 12/2008 | Kimura | 349/39 |
| 2009/0174831 A1* | 7/2009 | Chien et al. | 349/39 |

FOREIGN PATENT DOCUMENTS

| | | |
|---|---|---|
| JP | 2008-129607 A | 6/2008 |
| JP | 2008-287032 A | 11/2008 |
| JP | 2009-42611 A | 2/2009 |
| JP | 2010-39205 A | 2/2010 |

* cited by examiner

PIXEL CIRCUIT, DISPLAY DEVICE, AND METHOD FOR DRIVING DISPLAY DEVICE

TECHNICAL FIELD

The present invention relates to a display device which has a pixel having a plurality of subpixels.

BACKGROUND ART

Display devices in which each pixel includes a plurality of subpixels so that viewing angle characteristics of display are improved are widely known.

FIG. 18 illustrates a configuration of a pixel PIX100 provided in an active matrix liquid crystal display device, which is an example of such display devices (see Patent Literature 1 for example).

The pixel PIX100 is provided corresponding to each intersection of a scanning line Gi (i is an integer indicative of an ordinal number of each scanning line) and a data line Sj (j is an integer indicative of an ordinal number of each data line). The pixel PIX100 is constituted by two subpixels PIXa and PIXb that are different from each other in threshold voltage. Since the single pixel PIX100 is divided into two subpixels, i.e., the subpixel PIXa and the subpixel PIXb, distortion of a T-V (transmittance-voltage) characteristic of a liquid crystal layer is distributed between the subpixel PIXa and the subpixel PIXb, as described in Patent Literature 1. This makes it possible to suppress a phenomenon in which an image becomes whitish when viewed from an oblique angle. As a result, viewing angle characteristics can be improved.

The subpixel PIXa includes a transistor T101, a liquid crystal capacitor ClcA, and a storage capacitor CstA. The subpixel PIXb includes transistors T102 and T103, a liquid crystal capacitor ClcB, a storage capacitor CstB, and a buffer capacitor Cdown.

Each of the transistors T101, T102, and T103 is a TFT (Thin Film Transistor). All of the thin film transistors (hereinafter referred to as TFTs) in the pixel PIX100 are n-type TFTs. Generally, which of two terminals of an n-type TFT becomes a source terminal and which of the two terminals becomes a drain terminal depend on voltages applied to the respective terminals. Specifically, out of the two terminals, a terminal to which a smaller voltage is applied becomes a source terminal, and a terminal to which a larger voltage is applied becomes a drain terminal. However, description of an operation of a pixel circuit becomes complicated if the terminals are differently referred to depending on relationships between the voltages. Therefore, for convenience of description, even if a relationship between the voltages changes and thereby a relationship between the source and drain terminals changes, the terminals are referred to by identical terms to those first given, unless otherwise specified. The same applies to the Embodiments below.

In the subpixel PIXa, a gate terminal of the transistor T101 is connected to the scanning line Gi, a source terminal of the transistor T101 is connected to the data line Sj, and a drain terminal of the transistor T101 is connected to a node na. The liquid crystal capacitor ClcA is formed between the node na and a common electrode com101. The storage capacitor CstA is connected between the node na and a common electrode com2. To the common electrode com101, an electric potential Vcom101 is applied, and to the common electrode com102, an electric potential Vcom102 is applied. The electric potential Vcom101 is a DC electric potential (direct current electric potential).

In the subpixel PIXb, a gate terminal of the transistor T102 is connected to the scanning line Gi, a source terminal of the transistor T102 is connected to the data line Sj, and a drain terminal of the transistor T102 is connected to a node nb. The liquid crystal capacitor ClcB is formed between the node nb and the common electrode com1. The storage capacitor CstB is connected between the node nb and the common electrode com2. A gate terminal of the transistor T103 is connected to a scanning line Gi+1, a source terminal of the transistor T103 is connected to the node nb, and a drain terminal of the transistor T103 is connected to a node nc. The buffer capacitor Cdown is connected between the node nc and the common electrode com102.

Next, FIG. 19 illustrates a timing chart explaining a circuit operation of the pixel PIX100. It is assumed that the pixel PIX100 is driven according to data line inversion driving since a current liquid crystal panel is generally AC driven. This applies throughout this specification. The following describes a circuit operation of the pixel PIX100 with reference to the timing chart of FIG. 19. FIG. 19 illustrates an example in which electric potential waveforms of the nodes na, nb, and nc are ones achieved in a case where i=2 is satisfied. Further, FIG. 19 illustrates a case where a waveform of a data electric potential is one achieved in a case where j=1 (i.e., odd number) is satisfied. Note that in a case where j is an even number, the data electric potential has a waveform having a polarity reverse to that of the waveform achieved in a case where j is an odd number. The circuit diagrams of FIGS. 20 through 23 for explaining respective states of the pixel PIX100 are also referred to.

It is assumed that, in a first frame, an electric potential that is equal to or higher than the electric potential Vcom101 is applied to the node na and the node nb during light emission of the liquid crystal panel. That is, it is assumed that a voltage (liquid crystal applied voltage) of a positive polarity is applied between the node na and the common electrode com101 and between the node nb and the common electrode com101. Since the electric potential Vcom101 is a DC electric potential, an electric potential Vdata supplied from a data driver to the data line S1 has a positive polarity, i.e., satisfies Vdata≥Vcom101 in the first frame. It is assumed that, in a second frame, an electric potential that is equal to or lower than the electric potential Vcom101 is applied to the node na and the node nb during light emission of the liquid crystal panel, contrary to the first frame. That is, it is assumed that a voltage (liquid crystal applied voltage) of a negative polarity is applied between the node na and the common electrode com101 and between the node nb and the common electrode com101. In the second frame, the electric potential Vdata supplied from the data driver to the data line S1 has a negative polarity, i.e., satisfies Vdata≤Vcom101.

Similarly, in odd-numbered frames, a voltage Vdata which satisfies Vdata≥Vcom101 is supplied to the data line S1 so that a liquid crystal applied voltage of a positive polarity is applied between the node na and the common electrode com101 and between the node nb and the common electrode com101. In even-numbered frames, a voltage Vdata which satisfies Vdata≤Vcom101 is supplied to the data line S1 so that a liquid crystal applied voltage of a negative polarity is applied between the node na and the common electrode com101 and between the node nb and the common electrode com101.

In FIG. 19, the first frame starts at a time t0a, and an electric potential of the scanning line G0 changes from VGL to VGH at the time t0a. In the first frame, the electric potential Vdata having a positive polarity with respect to the electric potential Vcom101 is supplied to the data line S1 so that the electric potential having a positive polarity with respect to the electric potential Vcom101 is applied to the nodes na and nb, as described above. In FIG. 19, the electric potential Vdata of a positive polarity is represented by "Vdata(+)". The electric potential of the scanning line G1 returns to VGL by a time t1a that is 1 horizontal period after the time t0a. It is assumed that an electric potential of the node nc is β.

Next, at the time t1a, an electric potential of the scanning line G2 changes from VGL to VGH. This causes the transistors T101 and T102 of a pixel PIX corresponding to i=2 to turn on. Accordingly, the electric potential Vdata of the data line S1 at this time (in this case, Vdata(+)) is applied to the nodes na and nb. Since an electric potential of the scanning line G3 is VGL at this time, the transistor T103 maintains an OFF state. This state continues until a time t2a. This state of the pixel PIX100 is illustrated in FIG. 20.

The electric potential of the scanning line G2 returns from VGH to VGL by the time t2a that is 1 horizontal period after the time t1a. This causes the transistors T101 and T102 to be in an OFF state. Since the transistor T101 is in an OFF state, the electric potential of the node na of the subpixel PIXa is fixed to Vdata (in this case, Vdata(+)). This state of the pixel PIX100 is illustrated in FIG. 21.

Next, at the time t2a, an electric potential of the scanning line G3 changes from VGL to VGH. This causes the transistor T103 to be in an ON state. Since the transistor T102 is in an OFF state and the transistor T103 is in an ON state at this time, a positive electric charge is discharged from the storage capacitor CstB to the buffer capacitor Cdown. Since an odd-numbered frame is described here, it is presumed that the electric potential β of the node nc is lower than the electric potential Vdata of the node nb. Note, however, that in an even-numbered frame, the electric potential β of the node nc is higher than the electric potential Vdata of the node nb. Here, the electric potential of the node nb declines by α (α>0) due to the discharge. As a result, the electric potential of the node nb becomes Vdata-α (in this case, Vdata(+)-α). This state of the pixel PIX100 is illustrated in FIG. 22.

Note that α is determined depending on a capacitance ratio between the storage capacitor CstB and the buffer capacitor Cdown and on the electric potential of the node nc in a previous frame.

The electric potential of the scanning line G3 returns from VGH to VGL by a time t3a that is 1 horizontal period after the time t2a. This causes the transistor T103 to be in an OFF state. Accordingly, the electric potential Vdata-α is retained in the node nb of the subpixel PIXb, and the node nb of the subpixel PIXb maintains this electric potential until a next frame (time t1b). This state of the pixel PIX100 is illustrated in FIG. 23.

After elapse of a remaining time t4a of the first frame, the second frame starts.

In FIG. 19, the second frame starts at the time t0b, and the electric potential of the scanning line G1 changes from VGL to VGH at the time t0b. In the second frame, the electric potential Vdata having a negative polarity with respect to the electric potential Vcom101 is supplied to the data line S1 so that the electric potential having a negative polarity with respect to the electric potential Vcom101 is applied to the nodes na and nb, as described above. In FIG. 19, the electric potential Vdata of a negative polarity is represented by "Vdata(−)". The electric potential of the scanning line G1 returns to VGL by a time t1b that is 1 horizontal period after the time t0b.

Next, at the time t1b, an electric potential of the scanning line G2 changes from VGL to VGH. This causes the transistors T101 and T102 of the pixel PIX100 corresponding to i=2 to be in an ON state. Accordingly, the electric potential Vdata of the data line S1 at this time (in this case, Vdata(−)) is applied to the nodes na and nb. At this time, the transistor T103 maintains an OFF state since an electric potential of the scanning line G3 is VGL. This state continues until a time t2b. This state of the pixel PIX100 is illustrated in FIG. 20.

The electric potential of the scanning line G2 returns from VGH to VGL by the time t2b that is 1 horizontal period after the time t1b. This causes the transistors T101 and T102 to be in an OFF state. Since the transistor T101 is in an OFF state, the electric potential of the node na of the subpixel PIXa is fixed to Vdata (in this case, Vdata(−)). This state of the pixel PIX100 is illustrated in FIG. 21.

Next, at the time t2b, an electric potential of the scanning line G3 changes from VGL to VGH. This causes the transistor T103 to be in an ON state. Since the transistor T2 is in an OFF state and the transistor T103 is in an ON state at this time, a positive electric charge is discharged from the buffer capacitor Cdown to the storage capacitor CstB. Since an even-numbered frame is described here, it is presumed that the electric potential β of the node nc is higher than the electric potential Vdata of the node nb. Here, the electric potential of the node nb rises by α (α>0) due to the discharge. As a result, the electric potential of the node nb becomes Vdata+α (in this case, Vdata(−)+α). This state of the pixel PIX100 is illustrated in FIG. 22.

The electric potential of the scanning line G3 returns from VGH to VGL by a time t3b that is 1 horizontal period after the time t2b. This causes the transistor T103 to be in an OFF state. Accordingly, the electric potential Vdata+α is retained in the node nb of the subpixel PIXb, and the node nb of the subpixel PIXb maintains this electric potential during a remaining time t4b until a next frame. This state of the pixel PIX100 is illustrated in FIG. 23.

Subsequently, in odd-numbered frames, a circuit operation of the pixel PIX100 similar to that of the first frame is repeated, and in even-numbered frames, a circuit operation of the pixel PIX100 similar to that of the second frame is repeated.

According to the arrangement of the pixel PIX100, both in an odd-numbered frame and an even-numbered frame, a difference can be produced between a liquid crystal applied voltage retained in the subpixel PIXa and a liquid crystal applied voltage retained in the subpixel PIXb. This allows an improvement in viewing angle characteristic of a liquid crystal panel. Since it is possible to produce a difference in liquid crystal applied voltage between the subpixel PIXa and the subpixel PIXb with the use of an identical electric potential Vdata, the subpixel PIXa and the subpixel PIXb become regions that are different from each other in threshold voltage.

CITATION LIST

Patent Literature 1
Japanese Patent Application Publication, Tokukai, No. 2006-133577 A (Publication Date: May 25, 2006, especially Paragraphs [0027] and [0028])

SUMMARY OF INVENTION

Technical Problem

As described above, use of the pixel PIX100 having the circuit configuration illustrated in FIG. 18 allows a liquid crystal panel to have light emission of desired luminance. As a result, viewing angle characteristics can be improved.

However, as for the waveform of the node nc in FIG. 19, overshooting of an electric potential occurs at the point X which is an end of rising and at the point Y which is an end of falling.

Here, an electric current i flowing through a capacitor C is expressed as follows:

$$i = C \times dV/dt \text{ (}dV/dt \text{ is a capacitor electric potential difference per unit time)} \quad (A)$$

Accordingly, dV/dt becomes larger as a potential difference of the electric potential Vdata of data written into the subpixel PIXb between the first frame and the second frame becomes larger. Accordingly, an instantaneous electric current becomes larger. Consequently, overshooting of an electric potential is generated.

Especially, a liquid crystal panel is AC driven, and therefore has the following problem. For example, in a case where a data electric potential Vdata_max for obtaining maximum luminance is written into the pixel PIX in the first frame and the second frame, an electric potential Vdata_max(+) of a positive polarity is written in the first frame, and an electric potential Vdata_max(−) of a negative polarity is written in the second frame. Accordingly, dV becomes very large. Consequently, overshooting of an electric potential becomes large.

The overshooting of an electric potential causes a phenomenon in which an edge is overemphasized during display of a moving image, as described in Patent Literature 1.

In Patent Literature 1, in order to solve the problem, data correction is performed by comparing data of two frames. However, incorporating a circuit for the data correction into a display device causes an increase in cost of the display device. However, in a case where a driving method of producing a potential difference between the subpixel PIXa and the subpixel PIXb with the use of a capacitor is employed, it is difficult to avoid the overshooting. It is therefore desirable to suppress overshooting of an electric potential to minimum in order to simplify the circuit for the data correction.

The present invention was attained in view of the above conventional problems, and an object of the present invention is to provide a pixel circuit which has a plurality of subpixel circuits and which makes it possible to suppress overshooting of electric potentials in the subpixel circuits to a small level, a display device including the pixel circuit, and a method for driving the display device.

Solution to Problem

In order to attain the above object, a pixel circuit of the present invention includes:
a first subpixel circuit; and
a second subpixel circuit,
the first subpixel circuit including a first display element, a first node to which an electric potential determining a display state of the first display element is applied, a first external connection terminal, and a first switching element connected between the first node and the first external connection terminal,
the second subpixel circuit including a second display element, a second node to which an electric potential determining a display state of the second display element is applied, a second external connection terminal, a third external connection terminal, a second switching element connected between the second node and the second external connection terminal, and a third switching element connected between the second node and the third external connection terminal,
the first node and the second node being connected to each other via a first capacitor.

According to the invention, first, the first switching element is turned on so that an electric potential can be applied from the first external connection terminal to the first node, and the second switching element is turned on so that an electric potential can be applied from the second external connection terminal to the second node. Next, the first switching element and the second switching element are turned off, and the third switching element is turned on so that another electric potential is applied from the third external connection terminal to the second node. This allows different electric potentials to be applied to the first node and the second node due to an effect of the connection via the first capacitor.

Consequently, the first display element and the second display element can be operated as display elements with different threshold voltages.

Before the third switch is turned on, there is a stage of applying an electric potential from the first external connection terminal to the first node and applying an electric potential from the second external connection terminal to the second node. Accordingly, an electric potential of the second node and an electric potential of the first node connected to the second node via the first capacitor do not undergo a great change when the third switching element is turned on so that another electric potential is applied from the third external connection terminal to the second node. Consequently, overshooting of electric potentials of the subpixel circuits can be suppressed to a small level.

It is thus possible to produce an effect that a pixel circuit which includes a plurality of subpixel circuits and which makes it possible to suppress overshooting of electric potentials of the subpixel circuits to a small level can be provided.

In order to attain the above object, a display device of the present invention includes:
a display region in which the pixel circuit is disposed in a matrix;
a data line for supplying a data electric potential to the pixel circuit;
a scanning line for turning on/off the third switching element;
a first line for turning on the first switching element and the second switching element in each frame in a period followed by a period in which the third switching element is turned on by the scanning line;
a first power supply for supplying a first reference electric potential in each frame; and
a second power supply for supplying a second reference electric potential different from the first reference electric potential in each frame,
the first external connection terminal being connected to the first power supply,
the second external connection terminal being connected to the second power supply, and
the third external connection terminal being connected to the data line.

According to the invention, first, the first switching element is turned on so that a first reference electric potential can be applied from the first power supply to the first node, and the second switching element is turned on so that a second reference electric potential can be applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a display device including a pixel circuit which includes a plurality of subpixel circuits and which makes it possible to suppress overshooting of electric potentials of the subpixel circuits to a small level can be provided.

In order to attain the above object, a display device of the present invention includes:

a display region in which the pixel circuit is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being a constant electric potential common to all frames.

According to the invention, first, the first switching element is turned on so that a first reference electric potential can be applied from the first power supply to the first node, and the second switching element is turned on so that a second reference electric potential can be applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the second reference electric potential is a constant electric potential common to all frames and the first reference electric potential is alternately inverted between the first level and the second level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

In order to attain the above object, a display device of the present invention includes:

a display region in which the pixel circuit is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being alternately inverted between a third level and a fourth level for every frame.

According to the invention, first, the first switching element is turned on so that a first reference electric potential can be applied from the first power supply to the first node, and the second switching element is turned on so that a second reference electric potential can be applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the first reference electric potential is alternately inverted between the first level and the second level for every frame and the second reference electric potential is alternately inverted between the third level and the fourth level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

In order to attain the above object, a method of the present invention is a method for driving a display device including:

a display region in which a pixel circuit as set forth in any one of claims 1 through 4 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, and the third external connection terminal being connected to the data line, the method including the step of (a) writing the data electric potential into the pixel circuit, the step (a) including the steps of:

(b) causing the first line to turn on the first switching element and the second switching element so as to connect the first node to the first power supply and connect the second node to the second power supply;

(c) causing the first line to turn off the first switching element and the second switching element;

(d) causing the scanning line to turn on the third switching element so as to connect the second node to the data line to which the data electric potential is being supplied; and (e) causing the scanning line to turn off the third switching element.

According to the invention, the data electric potential is written into the pixel circuit as follows. First, the first switching element is turned on so that a first reference electric potential is applied from the first power supply to the first node, and the second switching element is turned on so that a second reference electric potential is applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a method for driving a display device including a pixel circuit which includes a plurality of subpixel circuits and which makes it possible to suppress overshooting of electric potentials of the subpixel circuits to a small level can be provided.

In order to attain the above object, a method of the present invention is a method for driving a display device including:

a display region in which a pixel circuit as set forth in claim 3 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being a constant electric potential common to all frames, the method including the step of (a) writing the data electric potential into the pixel circuit, the step (a) including the steps of:

(b) causing the first line to turn on the first switching element and the second switching element so as to connect the first node to the first power supply and connect the second node to the second power supply;

(c) causing the first line to turn off the first switching element and the second switching element;

(d) causing the scanning line to turn on the third switching element so as to connect the second node to the data line to which the data electric potential is being supplied; and (e) causing the scanning line to turn off the third switching element.

According to the invention, the data electric potential is written into the pixel circuit as follows. First, the first switching element is turned on so that a first reference electric potential is applied from the first power supply to the first node, and the second switching element is turned on so that a second reference electric potential is applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the second reference electric potential is a constant electric potential common to all frames and the first reference electric potential is alternately inverted between the first level and the second level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a method for driving a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

In order to attain the above object, a method of the present invention is a method for driving a display device including:

a display region in which a pixel circuit as set forth in claim 4 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being alternately inverted between a third level and a fourth level for every frame, the method including the step of (a) writing the data electric potential into the pixel circuit, the step (a) including the steps of:

(b) causing the first line to turn on the first switching element and the second switching element so as to connect the first node to the first power supply and connect the second node to the second power supply;

(c) causing the first line to turn off the first switching element and the second switching element;

(d) causing the scanning line to turn on the third switching element so as to connect the second node to the data line to which the data electric potential is being supplied; and (e) causing the scanning line to turn off the third switching element.

According to the invention, the data electric potential is written into the pixel circuit as follows. First, the first switching element is turned on so that a first reference electric potential is applied from the first power supply to the first node, and the second switching element is turned on so that a second reference electric potential is applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the first reference electric potential is alternately inverted between the first level and the second level for every frame and the second reference electric potential is alternately inverted between the third level and the fourth level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a method for driving a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

Advantageous Effects of Invention

As described above, a pixel circuit of the present invention includes:
a first subpixel circuit; and
a second subpixel circuit,
the first subpixel circuit including a first display element, a first node to which an electric potential determining a display state of the first display element is applied, a first external connection terminal, and a first switching element connected between the first node and the first external connection terminal,
the second subpixel circuit including a second display element, a second node to which an electric potential determining a display state of the second display element is applied, a second external connection terminal, a third external connection terminal, a second switching element connected between the second node and the second external connection terminal, and a third switching element connected between the second node and the third external connection terminal,
the first node and the second node being connected to each other via a first capacitor.

It is thus possible to produce an effect that a pixel circuit which includes a plurality of subpixel circuits and which makes it possible to suppress overshooting of electric potentials of the subpixel circuits to a small level can be provided.

As described above, a display device of the present invention includes:
a display region in which a pixel circuit as set forth in any one of claims 1 through 4 is disposed in a matrix;
a data line for supplying a data electric potential to the pixel circuit;
a scanning line for turning on/off the third switching element;
a first line for turning on the first switching element and the second switching element in each frame in a period followed by a period in which the third switching element is turned on by the scanning line;
a first power supply for supplying a first reference electric potential in each frame; and
a second power supply for supplying a second reference electric potential different from the first reference electric potential in each frame,
the first external connection terminal being connected to the first power supply,
the second external connection terminal being connected to the second power supply, and
the third external connection terminal being connected to the data line.

It is thus possible to produce an effect that a display device including a pixel circuit which includes a plurality of subpixel circuits and which makes it possible to suppress overshooting of electric potentials of the subpixel circuits to a small level can be provided.

As described above, a method of the present invention is a method for driving a display device including:
a display region in which a pixel circuit as set forth in any one of claims 1 through 4 is disposed in a matrix;
a data line for supplying a data electric potential to the pixel circuit;
a scanning line for turning on/off the third switching element;
a first line for turning on the first switching element and the second switching element in each frame in a period followed by a period in which the third switching element is turned on by the scanning line;
a first power supply for supplying a first reference electric potential in each frame; and
a second power supply for supplying a second reference electric potential different from the first reference electric potential in each frame,
the first external connection terminal being connected to the first power supply,
the second external connection terminal being connected to the second power supply, and
the third external connection terminal being connected to the data line,
the method including the step of (a) writing the data electric potential into the pixel circuit,
the step (a) including the steps of:
(b) causing the first line to turn on the first switching element and the second switching element so as to connect the first node to the first power supply and connect the second node to the second power supply;
(c) causing the first line to turn off the first switching element and the second switching element;
(d) causing the scanning line to turn on the third switching element so as to connect the second node to the data line to which the data electric potential is being supplied; and
(e) causing the scanning line to turn off the third switching element.

It is thus possible to produce an effect that a method for driving a display device including a pixel circuit which includes a plurality of subpixel circuits and which makes it possible to suppress overshooting of electric potentials of the subpixel circuits to a small level can be provided.

DESCRIPTION OF EMBODIMENTS

An embodiment of the present invention is described below with reference to FIGS. 1 through 17.

Transistors used in the present invention can be low-temperature polysilicon TFTs, CG (Continuous Grain) silicon TFTs, or amorphous silicon TFTs. A configuration and a formation process of these TFTs are publicly known, and therefore are not explained here.

First, an exemplary configuration of a display device is briefly described with reference to the drawings.

Figure 14:
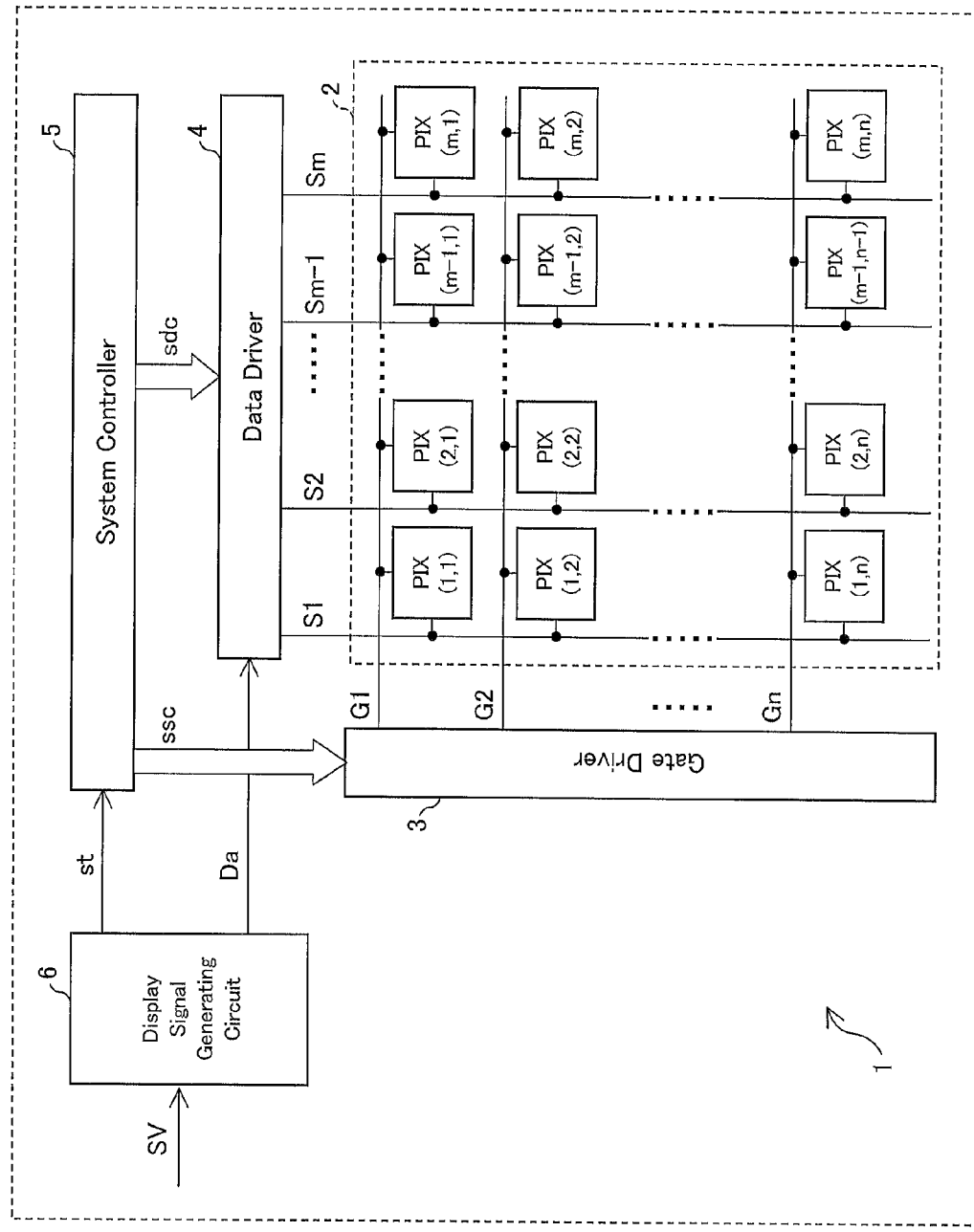
FIG. 14 illustrates an embodiment of the present invention, and is a block diagram illustrating a configuration of a display device.

FIG. 14 is a diagram illustrating an outline configuration of the display device. Note that the following describes a case where the display device is configured to include an active matrix display panel.

As illustrated in FIG. 14, a display device 1 mainly includes a display panel (pixel array) 2, a gate driver (scanning driver) 3, a data driver (source driver) 4, a system controller 5, and a display signal generating circuit 6.

The display panel 2 is, for example, a known transmissive or reflective liquid crystal display panel. In this case, a pixel carries out light emission display utilizing light emission from a backlight or a different light source such as external light. Display data and data electric potential determine luminance of the light emission.

In the present embodiment, a pixel PIX includes two or more subpixels. The following description deals with an exemplary arrangement in which the pixel PIX includes only two subpixels. Note, however, that the pixel PIX may include more than two subpixels. A detailed configuration of the pixel PIX is described in Examples (later described).

As illustrated in FIG. 14, the display panel 2 includes n scanning lines Gi (i is an integer which satisfies 1≤i≤n) that extend in a row direction, m data lines Sj (j is an integer which satisfies 1≤j≤m) that extend in a column direction, and n×m pixels PIX that are two-dimensionally disposed in a matrix, in accordance with a form of the display panel 2, in the vicinity of respective intersections of the n scanning lines Gi and the m data lines Sj.

As illustrated in FIG. 14, the gate driver 3 schematically includes a shift register circuit which includes a plurality of signal retention blocks corresponding to the respective scanning lines Gi of the display panel 2 and each having a circuit configuration equivalent to that of the above embodiment. The signal retention blocks of the shift register circuit sequentially output (transmit) a shift signal from top to bottom of the display panel 2 on the basis of a scan signal ssc, such as a scan control signal (scan start signal, scan end signal) or a scan clock signal, which is supplied from the system controller (LCD controller) 5 that is later described, and extract the shift signal as an external output signal and apply the external output signal as a scanning signal to each scanning line Gi so as to sequentially set pixels in each row to a selection state.

Based on a data control signal sdc supplied from the system controller 5, the data driver 4 (i) receives and retains display data Da for each row of the display panel 2, which display data Da is supplied from the display signal generating circuit 6, and (ii) generates a gradation signal (a gradation voltage or a gradation electric current) corresponding to the display data. The gradation signal is pixel information corresponding to the display data. Then, the data driver 4 supplies the gradation signal thus generated, in parallel, to the pixels having been set to the selection state by the gate driver 3, via the data lines Sj so that the gradation signal is written into the pixels.

The display signal generating circuit 6 extracts a luminance gradation signal component and a timing signal component from a video signal SV which is supplied, for example, from an outside of the display device 1, and the display signal generating circuit 6 supplies, as the display data Da, the luminance gradation signal component for each row of the display panel 2 to the data driver 4 and supplies the timing signal component st to the system controller 5.

The system controller 5 generates and outputs the scan control signal and the data control signal sdc at least to the gate driver 3 and the data driver 4, respectively, on the basis of the timing signal st supplied from the display signal generating circuit 6. The system controller 5 thus causes the drivers to operate at a predetermined timing so that the drivers supply a scanning signal and a gradation signal to the display panel 2. The system controller 5 thus causes a light emission driving operation to be successively executed in the pixels. In this way, predetermined image information based on a video signal is displayed on the display panel 2.

In a case where the shift register circuit is applied to the gate driver 3 of the display device 1 so that a driving pulse, the scan start signal, and the scan end signal, each of which has a predetermined cycle and which do not overlap in signal timing, are supplied from the system controller 5 as scan control signals, individual scanning signals can be applied to the scanning lines Gi on the basis of the external output signals that are sequentially outputted from the signal retention blocks and whose signal level fluctuation is suppressed.

Next, the following describes Examples of the pixel PIX.

Example 1

A pixel PIX of the present example is described with reference to FIGS. 1 through 7.

Figure 1:
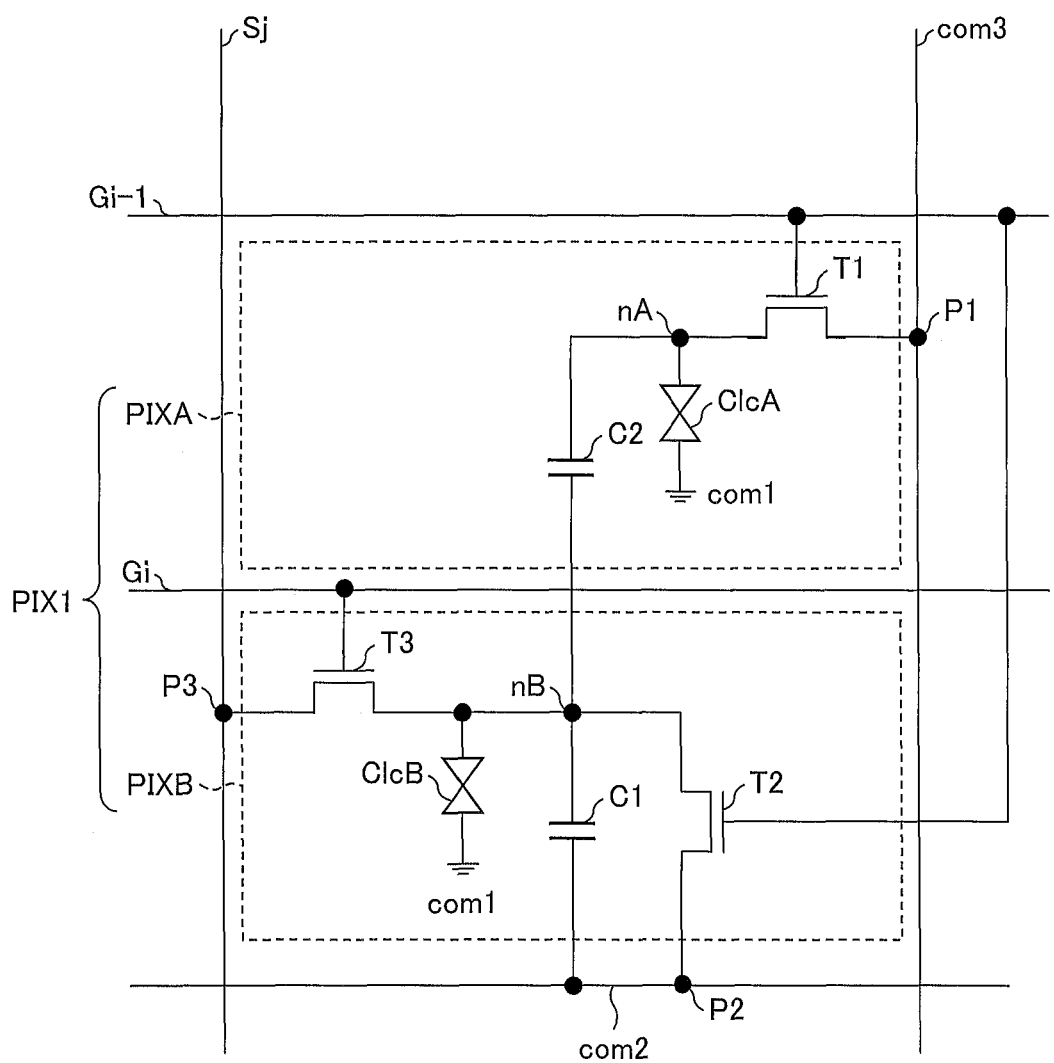
FIG. 1 illustrates an embodiment of the present invention, and is a circuit diagram illustrating a first configuration of a pixel circuit.

The present example describes a case where a pixel (pixel circuit) PIX1 illustrated in FIG. 1 is applied to the pixel PIX in FIG. 14.

As illustrated in FIG. 1, the pixel PIX1 includes a subpixel (first subpixel circuit) PIXA and a subpixel (second subpixel circuit) PIXB.

The pixel PIX1, the subpixel PIXA, and the subpixel PIXB may be referred to also as a pixel circuit, a first subpixel circuit, and a second subpixel circuit, respectively, provided that a pixel configuration can be described as an equivalent circuit.

The subpixel PIXA includes a transistor (first switching element) T1, a liquid crystal capacitor (first display element) ClcA, and a capacitor (first capacitor) C2.

The subpixel PIXB includes a transistor (second switching element) T2, a transistor (third switching element) T3, a liquid crystal capacitor (second display element) ClcB, and a capacitor (second capacitor) C1.

The transistors T1 through T3 are all n-type TFTs.

In the subpixel PIXA, a gate terminal of the transistor T1 is connected to a scanning line (first line) G−1, a source terminal of the transistor T1 is connected to a terminal (first external connection terminal) P1 of the pixel circuit PIX1, and a drain terminal of the transistor T1 is connected to a node nA. The terminal P1 is connected to a common electrode com3. Note that in a case where no scanning line G−1 corresponding to a row followed by the pixel circuit PIX1 is present (e.g., in a case where i=1), a first line is provided as an alternative to the scanning line G−1.

The liquid crystal capacitor ClcA is constituted by the node nA, a common electrode com1, and a liquid crystal layer sandwiched between the node nA and the common electrode com1. The node nA is synonymous with a pixel electrode of the liquid crystal capacitor ClcA from an electrical perspective.

The capacitor C2 is constituted by the node nA, a node nB (later described) of the subpixel PIXB, and an insulating layer sandwiched between the node nA and the node nB.

In the subpixel PIXB, a gate terminal of the transistor T2 is connected to the scanning line (first line) G−1, a source terminal of the transistor T2 is connected to a terminal (second external connection terminal) P2 of the pixel circuit PIX1, and a drain terminal of the transistor T2 is connected to the node nB. The terminal P2 is connected to a common electrode com2. A gate terminal of the transistor T3 is connected to a scanning line Gi, a source terminal of the transistor T3 is connected to a terminal (third external connection terminal) P3 of the pixel circuit PIX1, and a drain terminal of the transistor T3 is connected to the node nB. The terminal P3 is connected to a data line Sj.

The liquid crystal capacitor ClcB is constituted by the node nB, the common electrode com 1, and the liquid crystal layer sandwiched between the node nB and the common electrode com1. The node nB is synonymous with a pixel electrode of the liquid crystal capacitor ClcB from an electrical perspective.

The capacitor C1 is connected between the node nB and the terminal P2 in parallel with the transistor T2. The capacitor C1 is constituted by the node nB, the common electrode com2, and an insulating layer sandwiched between the node nB and the common electrode com2.

As is clear from the above description, the node nA and the node nB are connected to each other via the capacitor C2.

Figure 2:
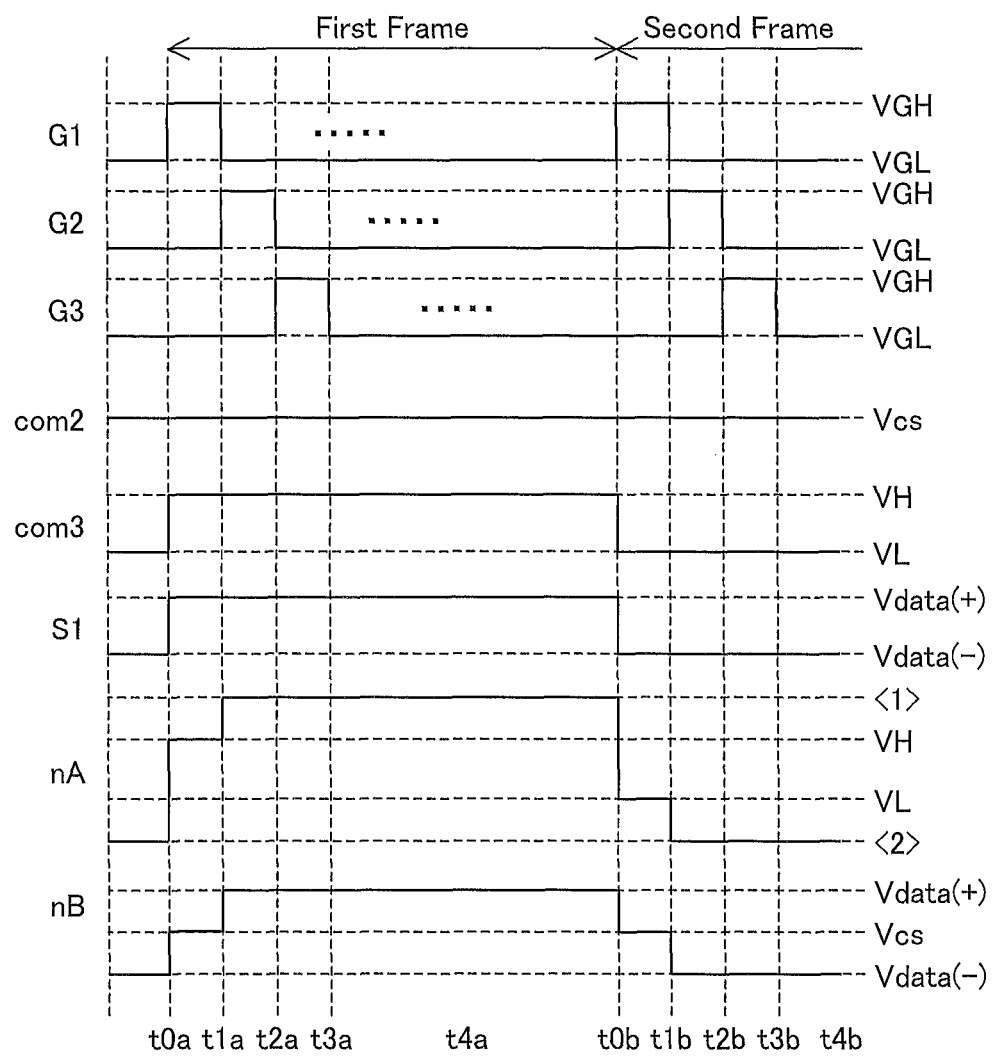
FIG. 2 is a timing chart explaining an operation of the pixel circuit of FIG. 1.

Next, FIG. 2 illustrates a timing chart explaining an operation of the pixel PIX1. The following describes an operation of the pixel PIX1 with reference to the timing chart of FIG. 2.

The circuit diagrams of FIGS. 3 through 6 explaining respective states of the pixel PIX1 are also referred to.

During a display period, the pixel PIX1 operates in such a manner that polarity inversion in a period which is the sum of a first frame and a second frame illustrated in FIG. 2 is repeated. The common electrode com2 serves as a second power supply which supplies an electric potential (second reference electric potential) Vcs which is a constant electric potential common to all frames. The common electrode com3 serves as a first power supply which supplies a first reference electric potential which is inverted between an electric potential VH (first level) and an electric potential VL (second level) for every frame. It is assumed that VH>VL. In the present example, the common electrode com3 has the electric potential VH in odd-numbered frames and has the electric potential VL in even-numbered frames.

The data electric potential Vdata includes a data electric potential Vdata(+) of a positive polarity, which is higher than an electric potential Vcom1 (not illustrated) of the common electrode com 1, and a data electric potential Vdata(−) of a negative polarity, which is lower than the electric potential Vcom1. The electric potential Vcom1 is a DC electric potential (direct current electric potential). In FIG. 2, the data electric potential Vdata(+) and the data electric potential Vdata(−) are illustrated as constant values. However, the present example is not limited to this. The data electric potential Vdata(+) and the data electric potential Vdata(−) each may have a plurality of gradation levels.

A scanning signal supplied to the gate line Gi has a High level VGH and a Low level VGL.

Figure 7:
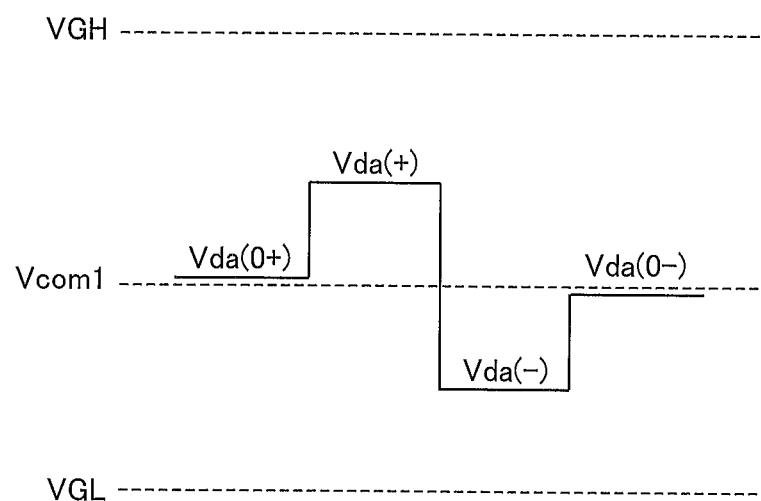
FIG. 7 illustrates an embodiment of the present invention, and is a diagram illustrating a relationship of electric potential levels.

FIG. 7 illustrates a relationship of levels of these electric potentials.

VGH>Vcom1>VGL is satisfied. Further, as for the data electric potential Vdata(+), VGH>Vda(+)>Vda(0+)>Vcom1 is satisfied where Vda(0+) is a minimum gradation electric potential of the data electric potential Vdata(+) and Vda(+) is a maximum gradation electric potential of the data electric potential Vdata(+). Similarly, as for the data electric potential Vdata(−), Vcom 1>Vda(0−)>Vda(−)>VGL is satisfied where Vda(0−) is a minimum gradation electric potential of the data electric potential Vdata(−) and Vda(−) is a maximum gradation electric potential of the data electric potential Vdata(−).

First, an operation in the first frame is described. Note that electric potential waveforms of the nodes nA and nB are ones obtained in the pixel PIX1 in a case where i=2.

At a time t0a at which the first frame starts, an electric potential of the scanning line G1 changes from VGL to VGH. This causes the transistors T1 and T2 to turn ON. Accordingly, the electric potential VH of the common electrode com3 is applied to the node nA, and the electric potential Vcs of the common electrode com2 is applied to the node nB. Consequently, a potential difference between both ends of the capacitor C1 becomes zero, and a potential difference between both ends of the capacitor C2 becomes VH-Vcs. For the pixel PIX1 in a row corresponding to i=2, the scanning line G1 serves as a first line which causes the transistors T1 and T2 to be in an ON period before a period in which the subpixel PIXB is selected by the scanning line G2. Although the first line may be a wire that is separately provided, the number of wires can be reduced in a case where the scanning line Gi serves also as the first line.

Figure 3:
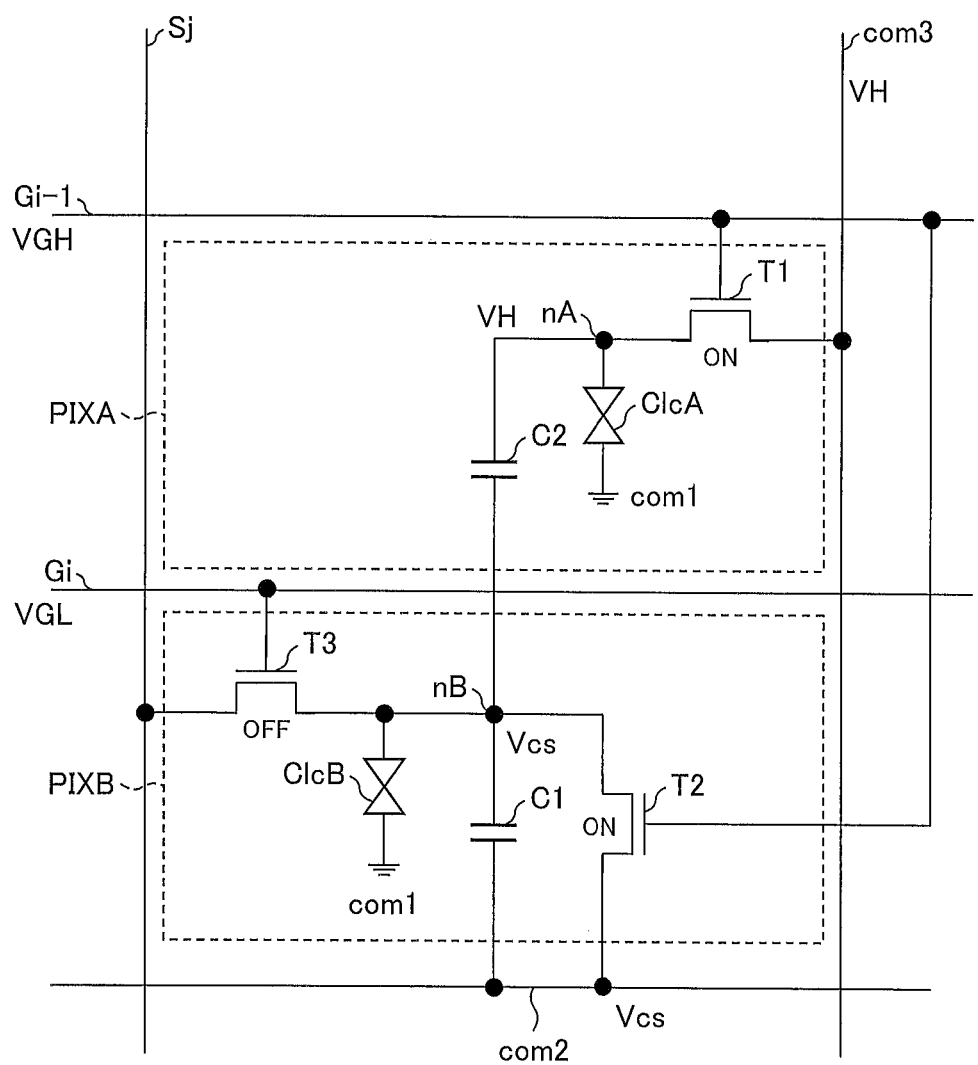
FIG. 3 is a circuit diagram illustrating a first state of the pixel circuit which operates in accordance with the timing chart of FIG. 2.

In a case where VH-Vcom1 and Vcs-Vcom1 are set to be equal to or lower than a liquid crystal threshold voltage, it is possible to improve contrast of the display device. As a result, it is possible to provide a higher-quality display device. Accordingly, in a state in which the electric potential VH is applied to the node nA, the liquid crystal capacitor ClcA is in a display state which does not exceed a threshold state, and in a state in which the electric potential Vcs is applied to the node nB, the liquid crystal capacitor ClcB is in a display state which does not exceed a threshold state. The electric potential of the scanning line G1 returns to VGL by a time t1a which is 1 horizontal period after the time t0a. This causes the transistors T1 and T2 to turn OFF. A state of the pixel PIX1 from the time t0a to the time t1a is illustrated in FIG. 3.

Next, at the time t1a, an electric potential of the scanning line G2 changes from VGL to VGH. This causes the transistor T3 to turn ON. Accordingly, the electric potential Vdata of the data line S1 at this time (here, Vda(+) included in Vdata(+) (Vda(+)≥Vcs) is applied to the node nB. Since an electric potential of the node nB is changed from Vcs to Vda, an electric potential V(nA) of the node nA, which is the other terminal of the capacitor C2, also changes. The electric potential V(nA) thus changed is expressed by the following equation:

$$V(nA)=VH+(Vda-Vcs)\times C2/(C2+ClcA) \quad (1)$$

The electric potential <1> of FIG. 2 is expressed by the above equation (1). Here, the electric potentials of the nodes nA and nB are maintained or increased so that both of the liquid crystal capacitors ClcA and ClcB are in a threshold state or a display state which exceeds the threshold state. Accordingly, there is a condition that Vda(+)≥Vcs.

Figure 4:
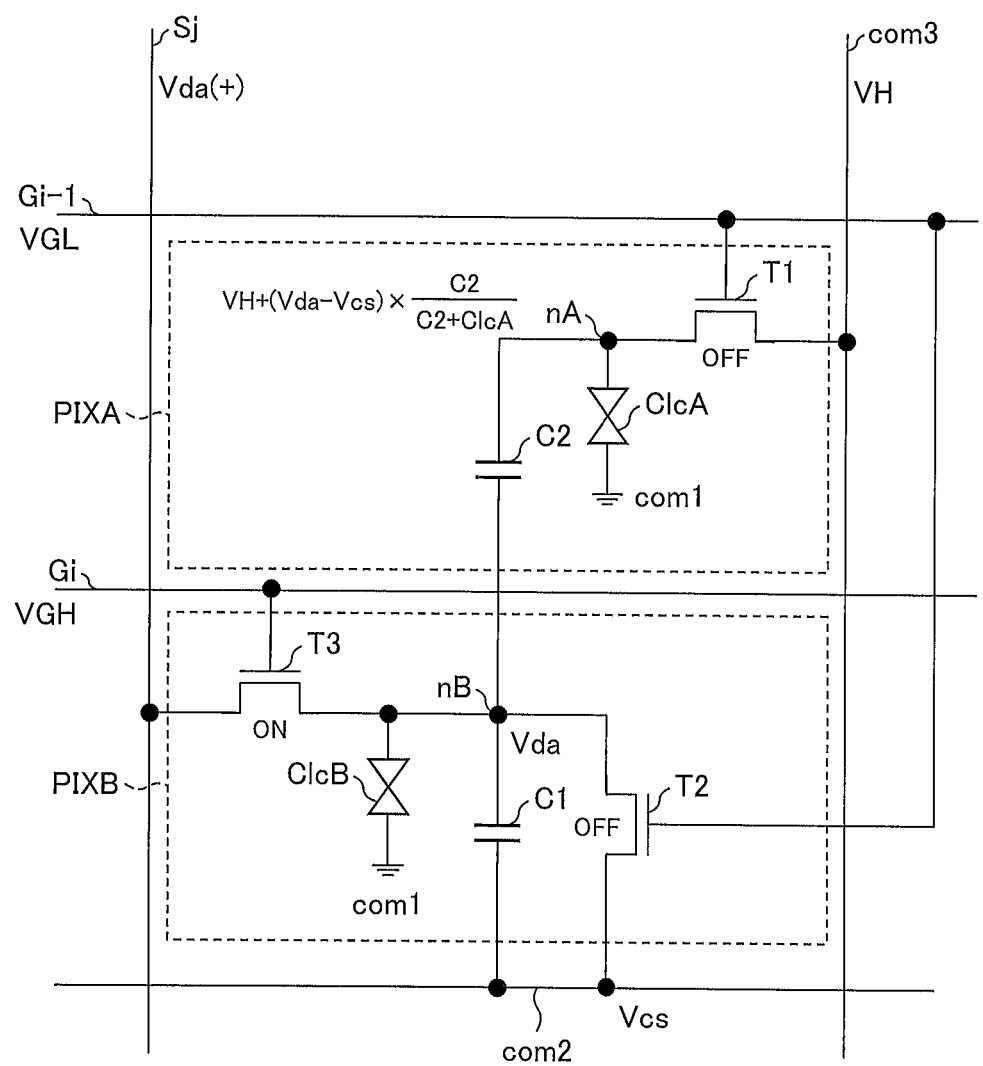
FIG. 4 is a circuit diagram illustrating a second state of the pixel circuit which operates in accordance with the timing chart of FIG. 2.

The electric potential of the scanning line G2 returns to VGL by the time t2a that is 1 horizontal period after the time t1a. This causes the transistor T3 to turn OFF. A state of the pixel PIX1 from the time t1a to the time t2a is illustrated in FIG. 4.

Next, after the time t2a, the transistors T1 through T3 are in an OFF state. Accordingly, a potential difference at the time t2a is maintained as the potential difference between both ends of the capacitor C2 until the end of the first frame (until a time t3a and a remaining time t4 elapse and scanning of the scanning line Gn ends). The potential difference between both ends of the capacitor C2 at this time is expressed by the following equation:

$$V(C2)=VH+(Vda-Vcs)\times C2/(C2+ClcA)-Vda \quad (2)$$

Accordingly, the potential difference expressed by the above equation (2) occurs between the subpixel PIXA and the subpixel PIXB.

Next, an operation of the pixel PIX1 in the second frame is described.

Figure 5:
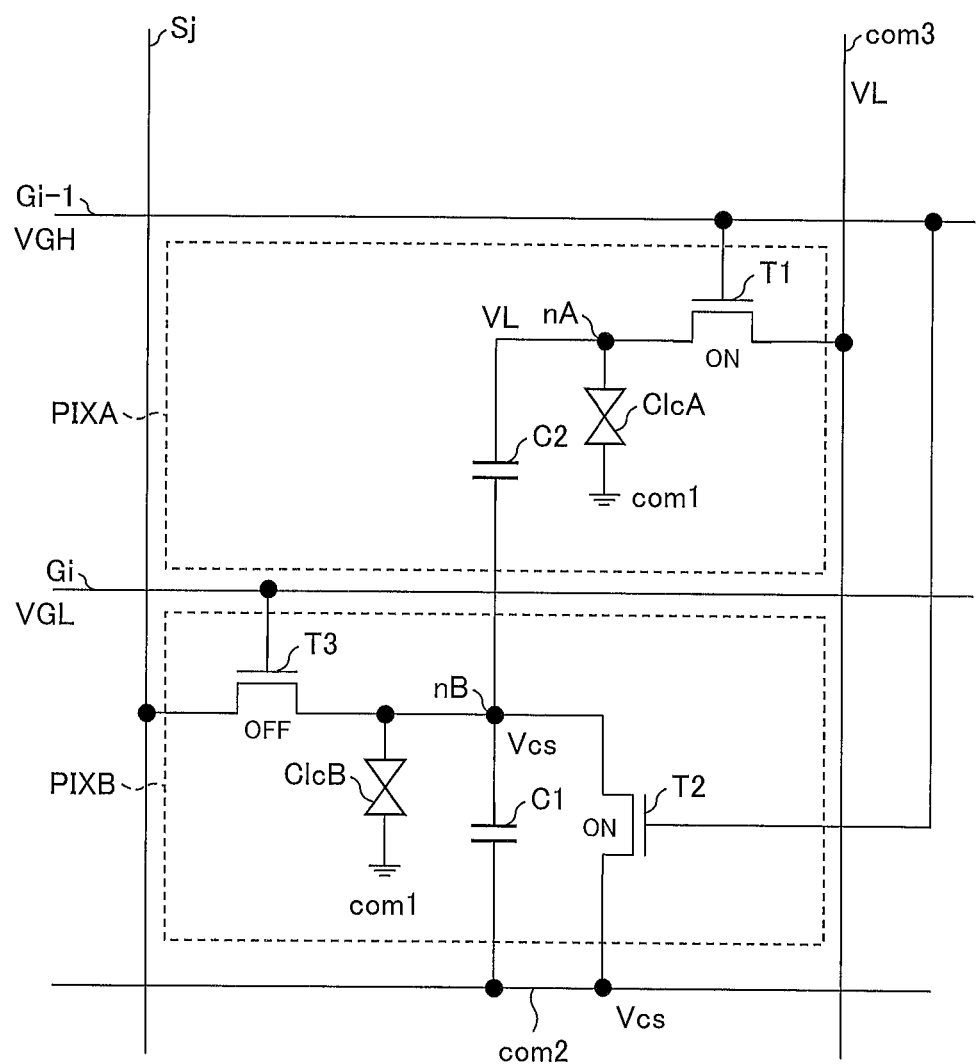
FIG. 5 is a circuit diagram illustrating a third state of the pixel circuit which operates in accordance with the timing chart of FIG. 2.

At a time t0b at which the second frame starts, the electric potential of the scanning line G1 changes from VGL to VGH, and the electric potential of the common electrode com3 changes from VH to VL. This causes the transistors T1 and T2 to turn ON. Accordingly, the electric potential VL of the common electrode com3 is applied to the node nA, and the electric potential Vcs of the common electrode com2 is applied to the node nB. Consequently, a potential difference between both ends of the capacitor C1 becomes zero, and a potential difference between both ends of the capacitor C2 becomes VL-Vcs. The electric potential of the scanning line G1 returns to VGL by a time t1b that is 1 horizontal period after the time t0b. A state of the pixel PIX1 from the time t0b to the time t1b is illustrated in FIG. 5.

Next, at the time t1b, the electric potential of the scanning line G2 changes from VGL to VGH. This causes the transistor T3 to be in an ON state. Accordingly, the electric potential Vdata of the data line S1 at this time (here, Vda(-) included in Vdata(-) (Vda(-)≤Vcs) is applied to the node nB. Since an electric potential of the node nB is changed from Vcs to Vda, an electric potential V(nA) of the node nA, which is the other terminal of the capacitor C2, also changes. The electric potential V(nA) thus changed is expressed by the following equation:

$$V(nA)=VL+(Vda-Vcs)\times C2/(C2+ClcA) \quad (3)$$

The electric potential <2> of FIG. 2 is expressed by the above equation (3). Here, the electric potentials of the nodes nA and nB are maintained or reduced so that both of the liquid crystal capacitors ClcA and ClcB are in a liquid crystal threshold state or a display state which exceeds the threshold state. Accordingly, there is a condition that Vda(-)≤Vcs.

Figure 6:
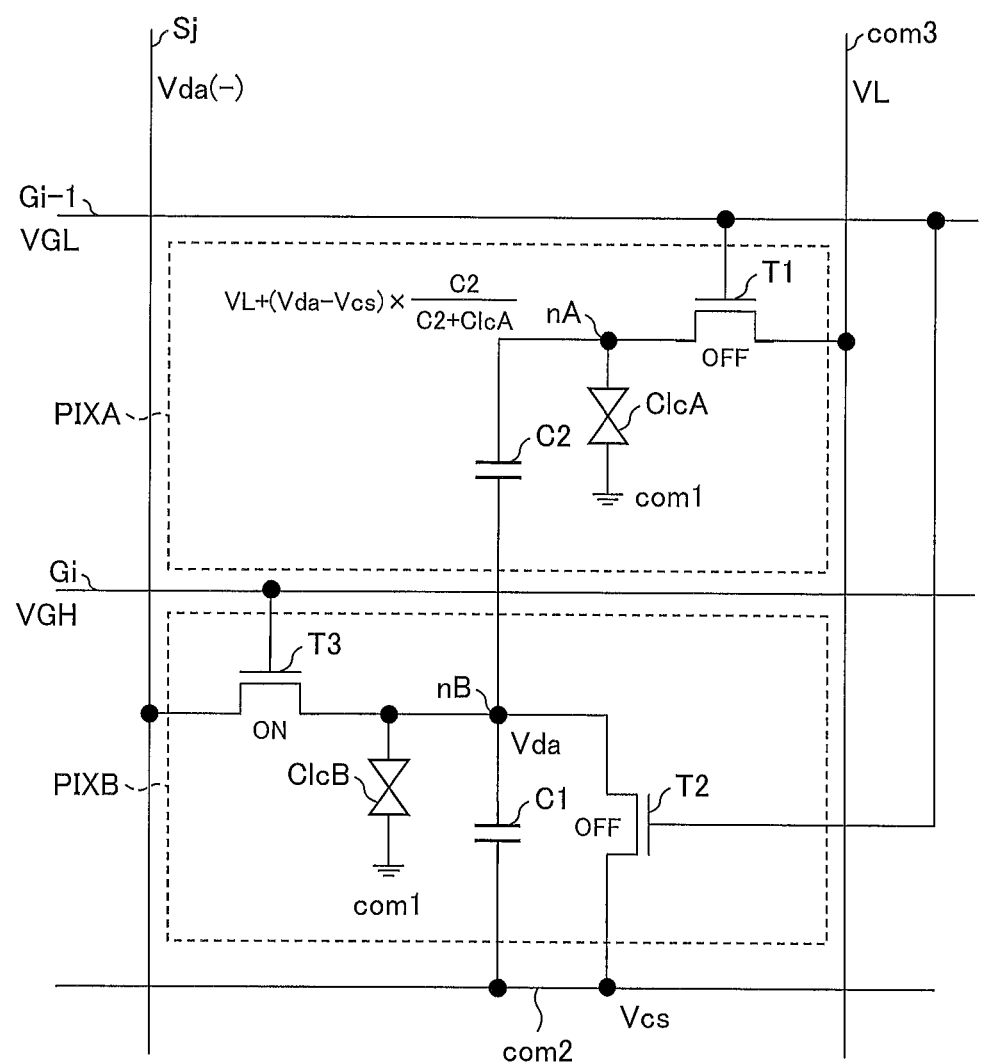
FIG. 6 is a circuit diagram illustrating a fourth state of the pixel circuit which operates in accordance with the timing chart of FIG. 2.

The electric potential of the scanning line G2 returns to VGL by the time t2b that is 1 horizontal period after the time t1b. A state of the pixel PIX1 from the time t1b to the time t2b is illustrated in FIG. 6.

Next, after the time t2b, the transistors T1 through T3 are in an OFF state. Accordingly, a potential difference at the time t2b is maintained as the potential difference between both ends of the capacitor C2 until the end of the second frame (until a time t3b and a remaining time t4b elapse and scanning of the scanning line Gn ends). Accordingly, the potential difference at the time t2b is maintained as the potential difference between both ends of the capacitor C2 until a next frame. The potential difference V(C2) of the capacitor C2 at this time is expressed by the following equation:

$$V(C2)=VL+(Vda-Vcs)\times C2/(C2+ClcA)-Vda \quad (4)$$

Accordingly, the potential difference expressed by the above equation (4) occurs between the subpixel PIXA and the subpixel PIXB.

Note that in a case where data line inversion driving, which is currently used in a general large-sized television, is carried out, the common electrode com3 is divided into two common electrodes, i.e., a common electrode com3a (not illustrated) to which an electric potential VH is applied and a common electrode com3b (not illustrated) to which an electric potential VL is applied. For example, in the first frame, the common electrode Vcom3a to which the electric potential VH is applied is connected to pixels PIX1 that are connected to data lines S1, S3, S5, . . . (odd-numbered data lines Sj), and the common electrode Vcom3b to which the electric potential VL is applied is connected to pixels PIX1 that are connected to data lines S2, S4, S6, . . . (even-numbered data lines Sj). In the second frame, the electric potential of the common electrode com3a and the electric potential of the common electrode com3b are inverted, so that the electric potentials VL and VH are applied to the common electrode com3a and the common electrode com3b, respectively. Accordingly, the common electrode com3a to which the electric potential VL is applied is connected to the pixels PIX1 that are connected to the odd-numbered data lines Sj, and the common electrode com3b to which the electric potential VL is applied is connected to the pixels PIX1 that are connected to the even-numbered data lines Sj.

In a case where data line inversion driving is carried out, in the first frame, the electric potential expressed by the equation (1) and the potential difference expressed by the equation (2) are applied to the subpixels PIXA and PIXB in the odd-numbered data lines Sj, and the electric potential expressed by the equation (3) and the potential difference expressed by the equation (4) are applied to the subpixels PIXA and PIXB in the even-numbered data lines Sj.

In the second frame, the potential difference expressed by the equation (4) is applied to the subpixels PIXA and PIXB in the odd-numbered data lines Sj, and the potential difference expressed by the equation (2) is applied to the subpixels PIXA and PIXB in the even-numbered data lines Sj, contrary to the first frame. Note that an operation contrary to that described above may be carried out. Specifically, in the first frame, the common electrode com3a to which the electric potential VL is applied is connected to the pixels PIX1 that are connected to the odd-numbered data lines Sj, and the common electrode com3b to which the electric potential VH is applied is connected to the pixels PIX1 that are connected to the even-numbered data lines Sj; and the potential difference expressed by the equation (4) is applied to the subpixels PIXA and PIXB in the odd-numbered data lines Sj, and the potential difference expressed by the equation (2) is applied to the subpixels PIXA and PIXB in the even-numbered data lines Sj.

Also in a case where scanning line inversion driving is carried out, the common electrode com3 is divided into two common electrodes, i.e., a common electrode com3a to which the electric potential VH is applied and a common electrode com3b to which the electric potential VL is applied. In this case, for example, in the first frame, the common electrode com3a to which the electric potential VH is applied is connected to the pixels PIX1 that are connected to the scanning line G1, G3, G5, . . . (odd-numbered scanning lines Gi), and the common electrode com3b to which the electric potential VL is applied is connected to the pixels PIX1 that are connected to the scanning lines G2, G4, G6, . . . (even-numbered scanning lines Gi). In the second frame, the electric potential of the common electrode com3a and the electric potential of the common electrode com3b are reversed, so that the electric potentials VL and VH are applied to the common electrode com3a and the common electrode com3b, respectively. Accordingly, the common electrode com3a to which the electric potential VL is applied is connected to the pixels PIX1 that are connected to the odd-numbered scanning lines Gi, and the common electrode com3b to which the electric potential VL is applied is connected to the pixels PIX1 that are connected to the even-numbered scanning lines Gi.

In a case where scanning line inversion driving is carried out, in the first frame, the electric potential expressed by the equation (1) and the potential difference expressed by the equation (2) are applied to the subpixels PIXA and PIXB in the odd-numbered scanning lines Gi, and the electric potential expressed by the equation (3) and the potential difference expressed by the equation (4) are applied to the subpixels PIXA and PIXB in the even-numbered scanning lines Gi.

In the second frame, the potential difference expressed by the equation (4) is applied to the subpixels PIXA and PIXB in the odd-numbered scanning lines Gi, and the potential difference expressed by the equation (2) is applied to the subpixels PIXA and PIXB in the even-numbered scanning lines Gi, contrary to the first frame. Note that an operation contrary to that described above may be carried out. Specifically, in the first frame, the common electrode com3a to which the electric potential VL is applied is connected to the pixels PIX1 that are connected to the odd-numbered scanning lines Gi, and the common electrode com3b to which the electric potential VH is applied is connected to the pixels PIX1 that are connected to the even-numbered scanning lines Gi; and the potential difference expressed by the equation (4) is applied to the subpixels PIXA and PIXB in the odd-numbered scanning lines Gi, and the potential difference expressed by the equation (2) is applied to the subpixels PIXA and PIXB in the even-numbered scanning lines Gi.

As described above, according to the pixel PIX1 of the present example, a potential difference between both ends of the capacitor C2 is set to VH (or VL)−Vcs (the time t0a or the time t0b) for every frame, and the electric potential of the node nA is set to VH or VL and the electric potential of the node nB is set to Vcs (the time t1a or the time t1b). Then, the electric potential of the node nB is set to Vda. As such, the electric potential of the node nB does not change from Vdata_max(+) to Vdata_max(−), but changes only by Vda−Vcs between the time t0a and the time t1a (or between the time t0b and the time t1b), unlike the conventional art. As a result, overshooting of the electric potential of the node nB can be suppressed. Accordingly, overshooting of the electric potential of the node nA that is connected to the node nB via the capacitor C2 can also be suppressed.

Since use of the pixel PIX1 makes it possible to suppress overshooting of an electric potential in a subpixel circuit to a small level, it is possible to simplify a data voltage correction circuit which is added to compensate the overshooting. It is therefore possible to provide a less expensive display device than a conventional one.

Example 2

A pixel PIX of the present example is described with reference to FIGS. 8 through 13.

Figure 8:
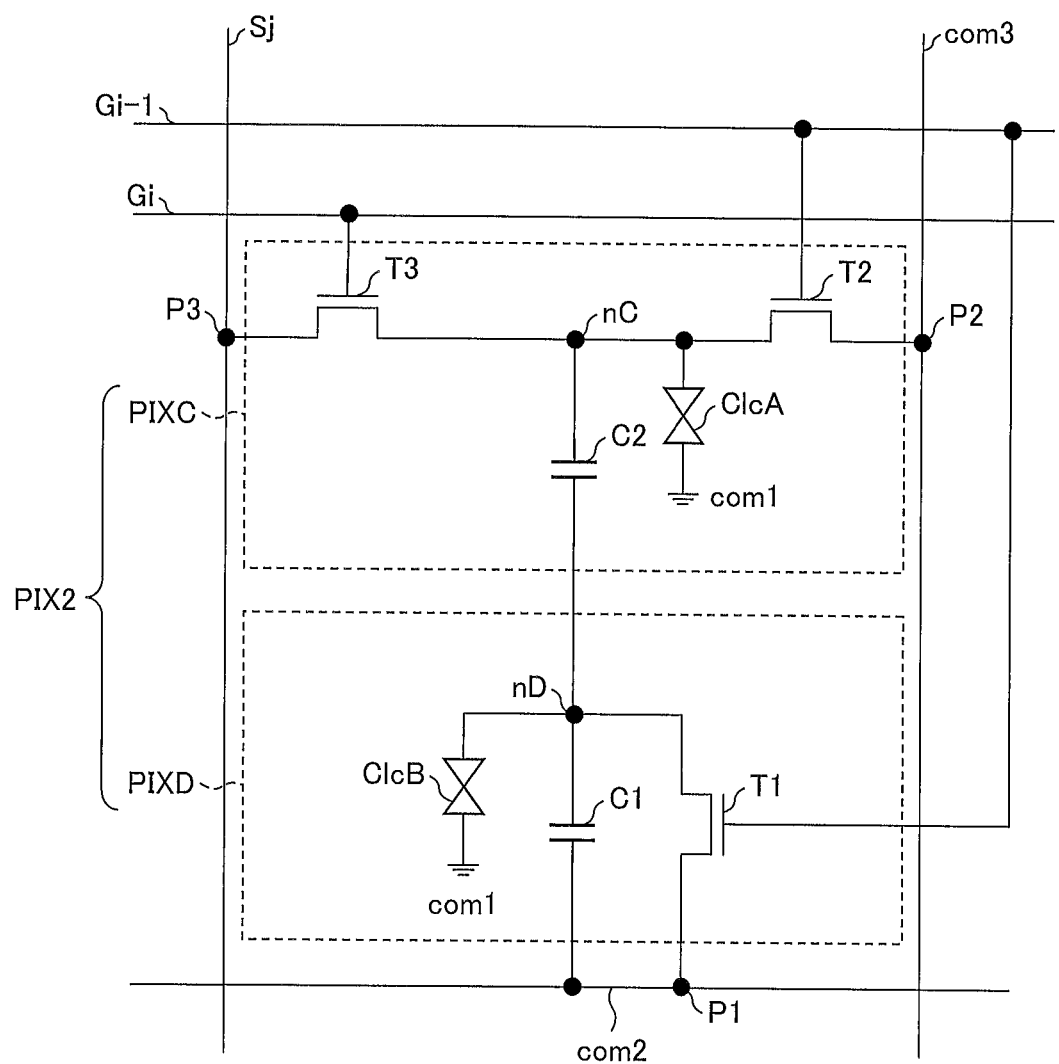
FIG. 8 illustrates an embodiment of the present invention, and is a circuit diagram illustrating a second configuration of a pixel circuit.

The present example describes a case where a pixel (pixel circuit) PIX2 illustrated in FIG. 8 is applied to the pixel PIX of FIG. 14.

As illustrated in FIG. 8, the pixel PIX2 includes a subpixel (second subpixel circuit) PIXC and a subpixel (first subpixel circuit) PIXD.

The pixel PIX2, the subpixel PIXC, and the subpixel PIXD may be referred to also as a pixel circuit, a first subpixel circuit, and a second subpixel circuit, provided that a pixel configuration can be explained as an equivalent circuit.

The subpixel PIXC includes a transistor (second switching element) T2, a transistor (third switching element) T3, a liquid crystal capacitor (second display element) ClcA, and a capacitor (second capacitor) C2.

The subpixel PIXD includes a transistor (first switching element) T1, a liquid crystal capacitor (first display element) ClcB, and a capacitor (first capacitor) C1.

The transistors T1 through T3 are all n-type TFTs.

In the subpixel PIXC, a gate terminal of the transistor T2 is connected to the scanning line (first line) G−1, a source terminal of the transistor T2 is connected to a terminal (second external connection terminal) P2 of the pixel circuit PIX2, and a drain terminal of the transistor T2 is connected to a node nC. The terminal P2 is connected to the common electrode com3. Note that in a case where no scanning line G−1 corresponding to a row followed by the pixel circuit PIX2 is present (e.g., in a case where i=1), a first line is provided as an alternative to the scanning line G−1. A gate terminal of the transistor T3 is connected to a scanning line Gi, a source terminal of the transistor T3 is connected to a terminal (third external connection terminal) P3 of the pixel circuit PIX2, and a drain terminal of the transistor T3 is connected to the node nC. The terminal P3 is connected to a data line Sj.

The liquid crystal capacitor ClcA is constituted by the node nC, a common electrode com1, and a liquid crystal layer sandwiched between the node nC and the common electrode com1. The node nC is synonymous with a pixel electrode of the liquid crystal capacitor ClcA from an electrical perspective.

The capacitor C2 is constituted by the node nC, a node nD (later described) of the subpixel PIXD, and an insulating layer sandwiched between the node nC and the node nD.

In the subpixel PIXD, a gate terminal of the transistor T1 is connected to a scanning line (first line) G−1, a source terminal of the transistor T1 is connected to a terminal (first external connection terminal) P1 of the pixel PIX2, and a drain terminal of the transistor T1 is connected to the node nD. The terminal P1 is connected to the common electrode com2.

The liquid crystal capacitor ClcB is constituted by the node nD, the common electrode com1, and the liquid crystal layer sandwiched between the node nD and the common electrode com1. The node nD is synonymous with a pixel electrode of the liquid crystal capacitor ClcB from an electrical perspective.

The capacitor C1 is connected between the node nD and the terminal P1 in parallel with the transistor T1. The capacitor C1 is constituted by the node nD, the common electrode com2, and an insulating layer sandwiched between the node nD and the common electrode com2.

As is clear from the above description, the node nC and the node nD are connected to each other via the capacitor C2.

Figure 9:
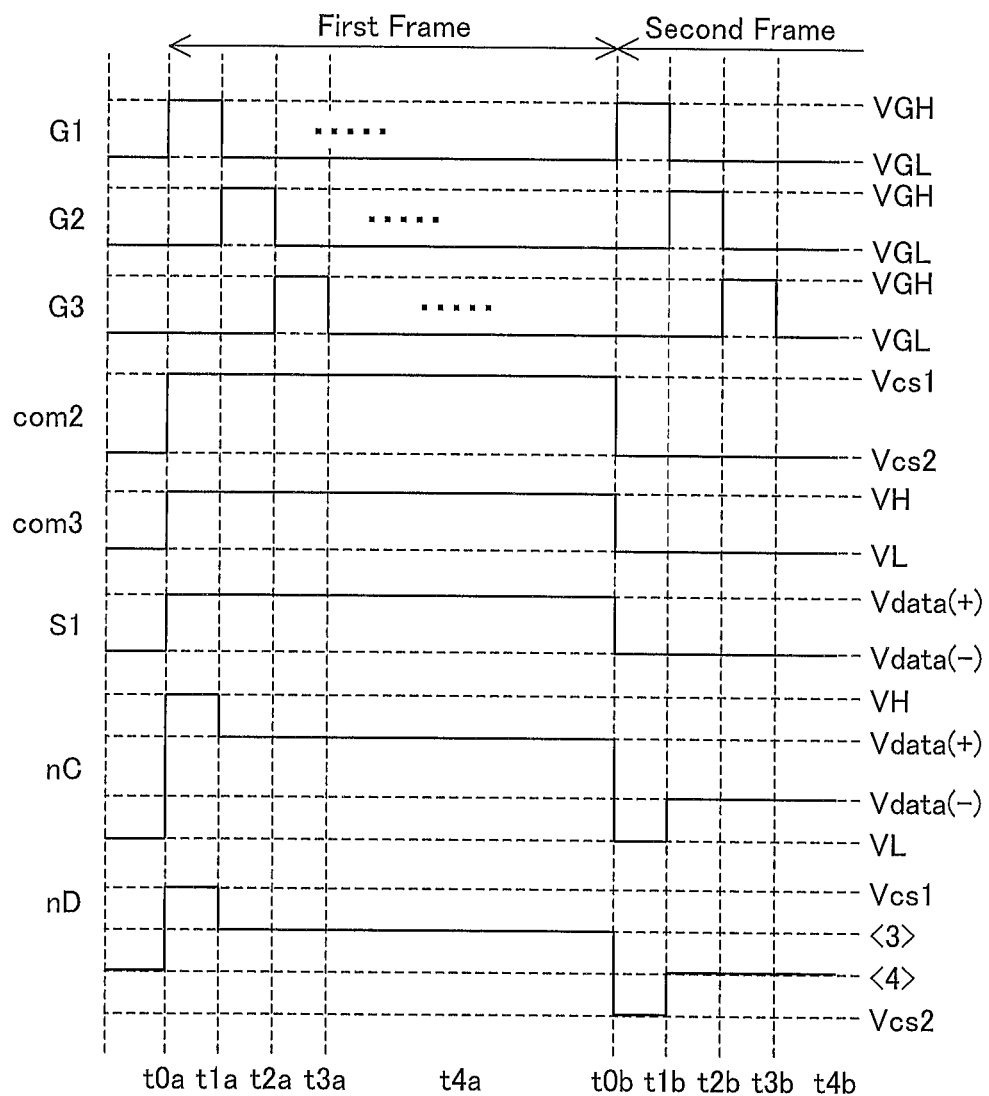
FIG. 9 is a timing chart explaining an operation of the pixel circuit of FIG. 8.

Next, FIG. 9 illustrates a timing chart explaining an operation of the pixel PIX2. The following describes an operation of the pixel PIX2 with reference to the timing chart of FIG. 9. The circuit diagrams of FIGS. 10 through 13 explaining respective states of the pixel PIX2 are also referred to.

During a display period, the pixel PIX2 operates in such a manner that polarity inversion in a period which is the sum of a first frame and a second frame illustrated in FIG. 9 is repeated. The common electrode com2 serves as a first power supply which supplies a first reference electric potential which is inverted between an electric potential Vcs1 (first level) and an electric potential Vcs2 (second level) for every frame. The common electrode com3 serves as a second power supply which supplies a second reference electric potential which is inverted between an electric potential VH (third level) and an electric potential VL (fourth level) for every frame. It is assumed that VH>VL, |VH|>|Vcs1|, and |VL|>|Vcs2| are satisfied. In the present example, the common electrode com2 has the electric potential Vcs1 in odd-numbered frames and has the electric potential Vcs2 in even-numbered frames, and the common electrode com3 has the electric potential VH in odd-numbered frames and has the electric potential VL in even-numbered frames.

The data electric potential Vdata includes a data electric potential Vdata(+) of a positive polarity, which is higher than an electric potential Vcom1 (not illustrated) of the common electrode com1, and a data electric potential Vdata(−) of a negative polarity, which is lower than the electric potential Vcom1. The electric potential Vcom1 is a direct current electric potential. In FIG. 9, the data electric potential Vdata(+) and the data electric potential Vdata(−) are illustrated as constant values. However, the present example is not limited to this. The data electric potential Vdata(+) and the data electric potential Vdata(−) each may have a plurality of gradation levels.

A scanning signal supplied to the gate line Gi has a High level VGH and a Low level VGL.

A relationship of levels of these electric potentials is as illustrated in FIG. 7.

First, an operation in the first frame is described.

At a time t0a at which the first frame starts, an electric potential of the scanning line G1 changes from VGL to VGH. This causes the transistors T1 and T2 to turn ON. Accordingly, the electric potential VH of the common electrode com3 is applied to the node nC, and the electric potential Vcs1 of the common electrode com2 is applied to the node nD. Consequently, a potential difference between both ends of the capacitor C1 becomes zero, and a potential difference between both ends of the capacitor C2 becomes VH-Vcs1. Here, the electric potential VH and the electric potential Vcs1 (|VH|>|Vcs1|) are set to electric potentials for obtaining a maximum gradation of the pixel PIX2. For a pixel PIX2 in a row corresponding to i=2, the scanning line G1 serves as a first line which causes the transistors T1 and T2 to be in an ON period before a period in which the subpixel PIXB is selected by the scanning line G2. Although the first line may be a wire that is separately provided, the number of wires can be reduced in a case where the scanning line Gi serves also as the first line.

Figure 10:
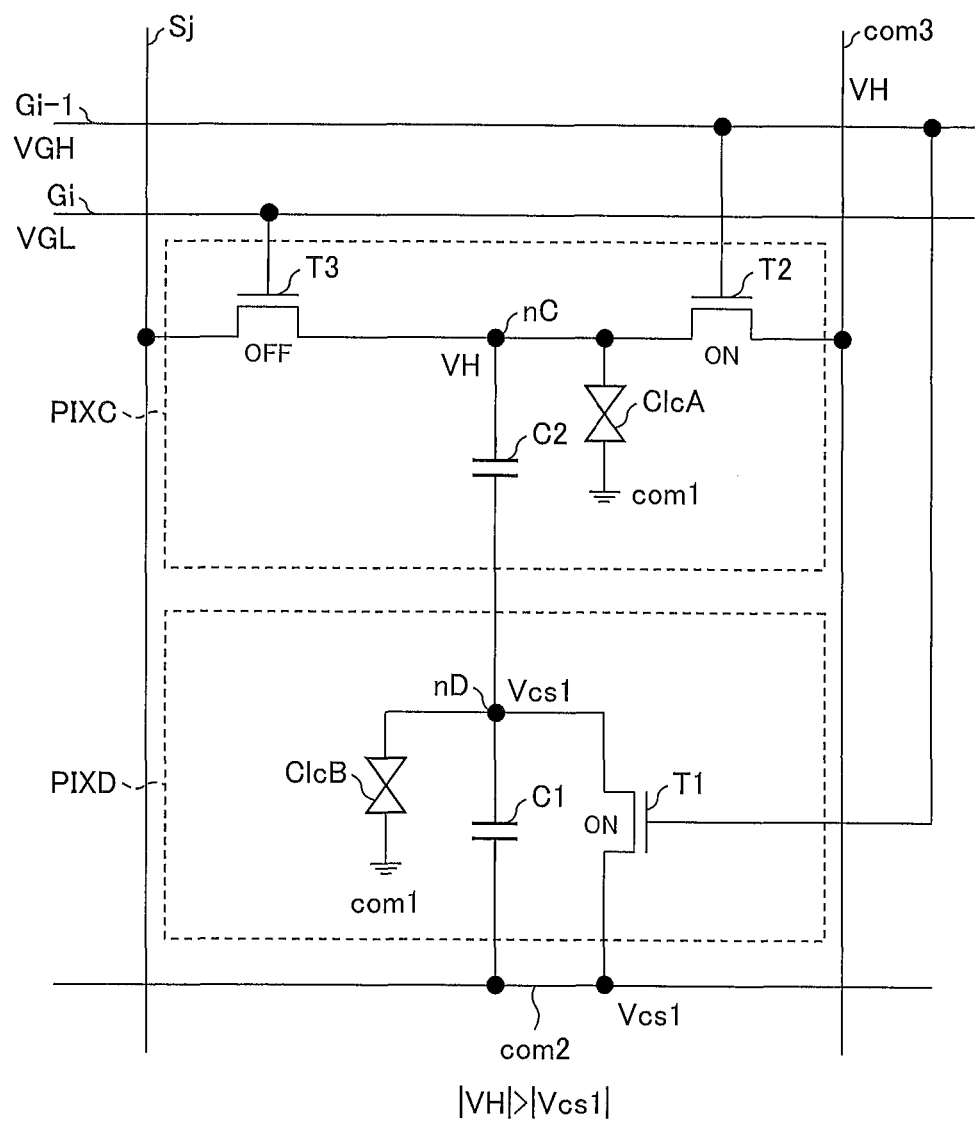
FIG. 10 is a circuit diagram illustrating a first state of the pixel circuit which operates in accordance with the timing chart of FIG. 9.

In a case where VH−Vcom1 and Vcs1−Vcom1 are set to be equal to or lower than a liquid crystal threshold voltage, it is possible to improve contrast of the display device. As a result, it is possible to provide a higher-quality display device. Accordingly, in a state in which the electric potential VH is applied to the node nC, the liquid crystal capacitor ClcA is in a display state which does not exceed a threshold state, and in a state in which the electric potential Vcs1 is applied to the node nD, the liquid crystal capacitor ClcB is in a display state which does not exceed a threshold state. The electric potential of the scanning line G1 returns to VGL by a time t1a which is 1 horizontal period after the time t0a. This causes the transistors T1 and T2 to turn OFF. A state of the pixel PIX2 from the time t0a to the time t1a is illustrated in FIG. 10.

Next, at the time t1a, an electric potential of the scanning line G2 changes from VGL to VGH. This causes the transistor T3 to turn ON. Accordingly, the electric potential Vdata of the data line S1 at this time (here, Vda(+) included in Vdata(+)) (Vda(+)≤VH) is applied to the node nC. Since an electric potential of the node nC is changed from VH to Vda, an electric potential of the node nD, which is the other terminal of the capacitor C2, also changes. The electric potential thus changed is expressed by the following equation:

$$V(nD)=Vcs1-(VH-Vda)\times C2/(C1+C2+ClcA) \quad (5)$$

The electric potential <3> of FIG. 9 is expressed by the above equation (5). Here, the electric potentials of the nodes nC and nD are maintained or reduced so that both of the liquid crystal capacitors ClcA and ClcB are in a liquid crystal threshold state or a display state which exceeds the threshold state. Accordingly, there is a condition that Vda(+)≤VH.

Figure 11:
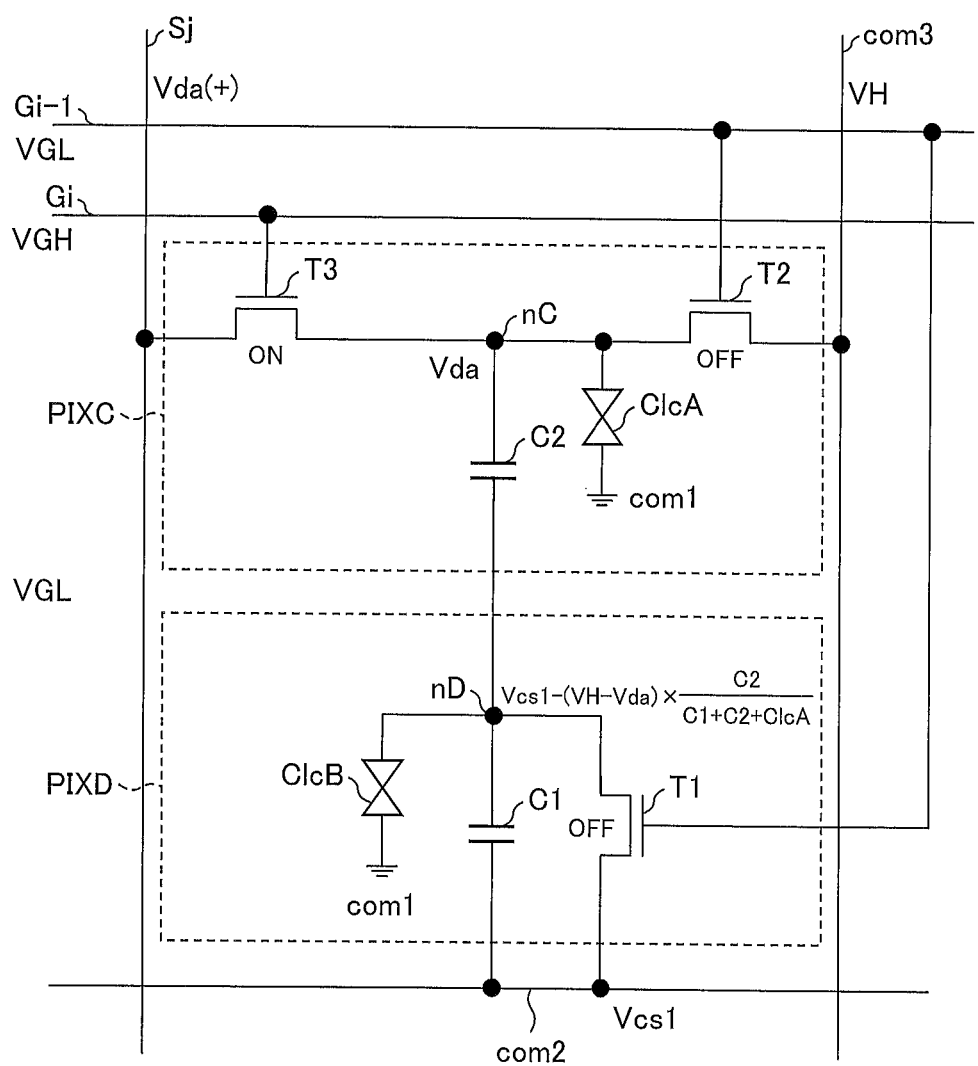
FIG. 11 is a circuit diagram illustrating a second state of the pixel circuit which operates in accordance with the timing chart of FIG. 9.

The electric potential of the scanning line G2 returns to VGL by the time t2a that is 1 horizontal period after the time t1a. This causes the transistor T3 to turn OFF. A state of the pixel PIX1 from the time t1a to the time t2a is illustrated in FIG. 11.

Next, after the time t2a, the transistors T1 through T3 are in an OFF state. Accordingly, a potential difference at the time t2a is maintained as the potential difference between both ends of the capacitor C2 until the end of the first frame (until a time t3a and a remaining time t4 elapse and scanning of the scanning line Gn ends). The potential difference V(C2) between both ends of the capacitor C2 at this time is expressed by the following equation:

$$V(C2)=Vda-Vcs1+(VH-Vda)\times C2/(C1+C2+ClcA) \quad (6)$$

Accordingly, the potential difference expressed by the above equation (6) occurs between the subpixel PIXC and the subpixel PIXD.

Next, an operation in the second frame is described.

At a time t0b at which the second frame starts, the electric potential of the scanning line G1 changes from VGL to VGH, and the electric potential of the common electrode com3 changes to VL. This causes the transistors T1 and T2 to turn ON. Accordingly, the electric potential VL of the common electrode com3 is applied to the node nC, and the electric potential Vcs2 of the common electrode com2 is applied to the node nD. Consequently, a potential difference between both ends of the capacitor C1 becomes zero, and a potential difference between both ends of the capacitor C2 becomes VL−Vcs2. Here, the electric potential VL and the electric potential Vcs2 (|VL|>|Vcs2|) are set to electric potentials for obtaining a maximum gradation of the pixel PIX2.

Figure 12:
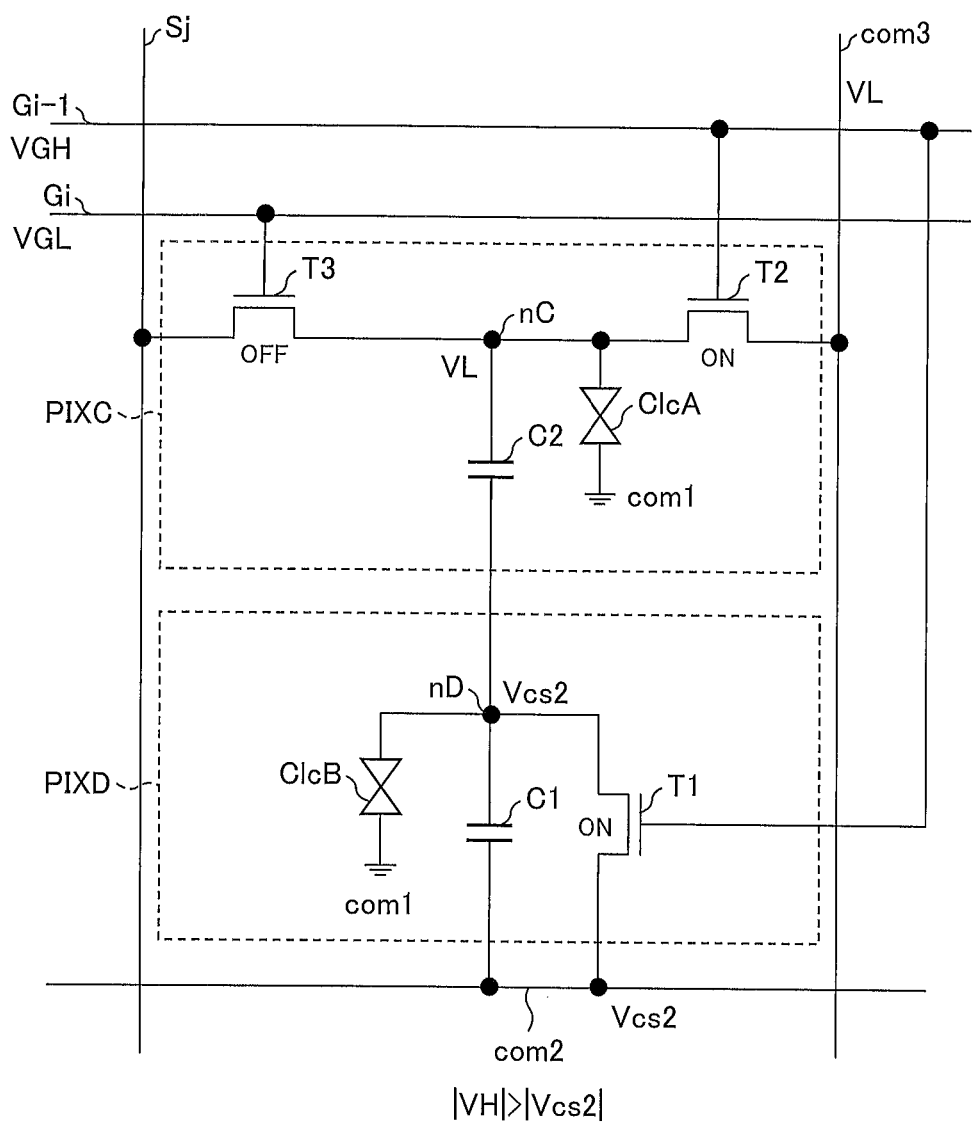
FIG. 12 is a circuit diagram illustrating a third state of the pixel circuit which operates in accordance with the timing chart of FIG. 9.

The electric potential of the scanning line G1 returns to VGL by a time t1b that is 1 horizontal period after the time t0b. This causes the transistors T1 and T2 to turn OFF. A state of the pixel PIX2 from the time t0b to the time t1b is illustrated in FIG. 12.

Next, at the time t1b, the electric potential of the scanning line G2 changes from VGL to VGH. This causes the transistor T3 to turn ON. Accordingly, the electric potential Vdata of the data line S1 at this time (here, Vda(−) included in Vdata(−)) (Vda(−)≥VL) is applied to the node nC. Since an electric potential of the node nC is changed from VL to Vda, an electric potential V(nD) of the node nD, which is the other terminal of the capacitor C2, also changes. The electric potential V(nD) thus changed is expressed by the following equation:

$$V(nD)=Vcs2-(VL-Vda) \times C2/(C1+C2+ClcA) \quad (7)$$

The electric potential <4> of FIG. 9 is expressed by the above equation (5). Here, the electric potentials of the nodes nC and nD are maintained or increased so that both of the liquid crystal capacitors ClcA and ClcB are in a liquid crystal threshold state or a display state which exceeds the threshold state. Accordingly, there is a condition that Vda(−)≥VL.

Figure 13:
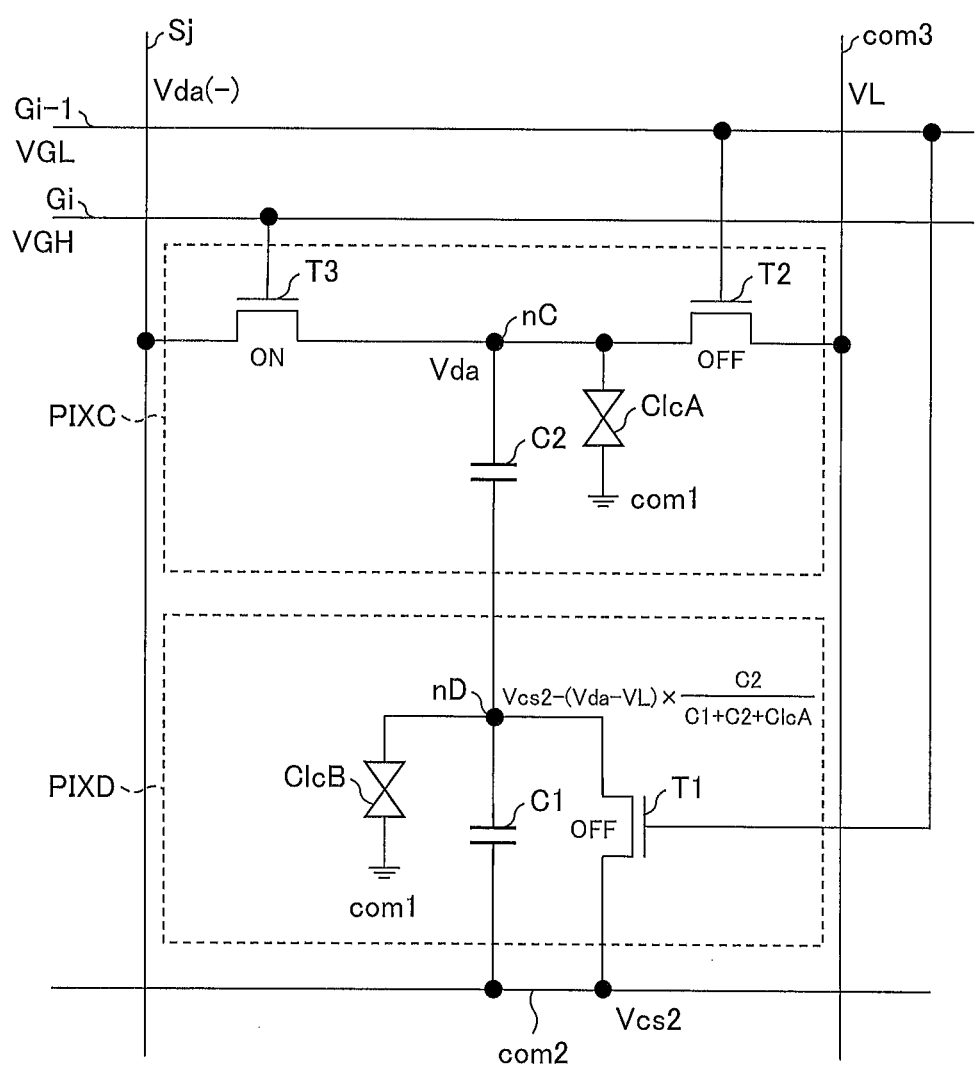
FIG. 13 is a circuit diagram illustrating a fourth state of the pixel circuit which operates in accordance with the timing chart of FIG. 9.

The electric potential of the scanning line G2 returns to VGL by the time t2b that is 1 horizontal period after the time t1b. This causes the transistor T3 to turn OFF. A state of the pixel PIX1 from the time t1b to the time t2b is illustrated in FIG. 13.

Next, after the time t2b, the transistors T1 through T3 are in an OFF state. Accordingly, a potential difference at the time t2b is maintained as the potential difference between both ends of the capacitor C2 until the end of the second frame (until a time t3b and a remaining time t4b elapse and scanning of the scanning line Gn ends). The potential difference V(C2) between both ends of the capacitor C2 at this time is expressed by the following equation:

$$V(C2)=Vda-Vcs2+(VL-Vda) \times C2/(C1+C2+ClcA) \quad (8)$$

Accordingly, the potential difference expressed by the above equation (8) occurs between the subpixel PIXC and the subpixel PIXD.

Note that data line inversion driving and scanning line inversion driving are carried out according to a similar operation principle to that of Example 1, and therefore are not explained repeatedly.

As described above, according to the pixel PIX2 of the present example, a potential difference between both ends of the capacitor C2 is set to VH−Vcs1 or Vcs2−VL (the time t0a or the time t0b) for every frame, and the electric potential of the node nC is set to VH or VL and the electric potential of the node nD is set to Vcs1 or Vcs2 (the time t1a or the time t1b). Then, the electric potential of the node nC is set to Vda. As such, the electric potential of the node nC does not change from Vdata_max(+) to Vdata_max(−), but changes only by VH−Vda or VL−Vda between the time t0a and the time t1a (or between the time t0b and the time t1b), unlike the conventional art. As a result, overshooting of the electric potential of the node nC can be suppressed. Accordingly, overshooting of the electric potential of the node nD that is connected to the node nC via the capacitor C2 can also be suppressed.

Since use of the pixel PIX2 illustrated in FIG. 8 makes it possible to suppress overshooting of an electric potential in a subpixel circuit to a small level, it is possible to simplify a data voltage correction circuit which is added to compensate the overshooting. It is therefore possible to provide a less expensive display device than a conventional one.

Examples have been thus described.

Figure 15:
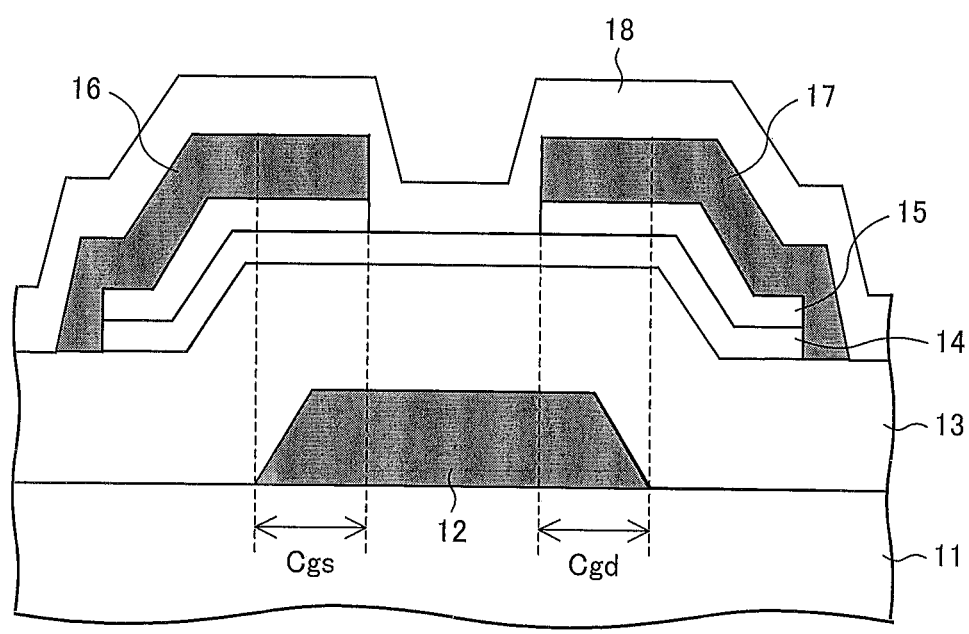
FIG. 15 illustrates an embodiment of the present invention, and is a cross-sectional view illustrating a configuration of a transistor.
Figure 16:
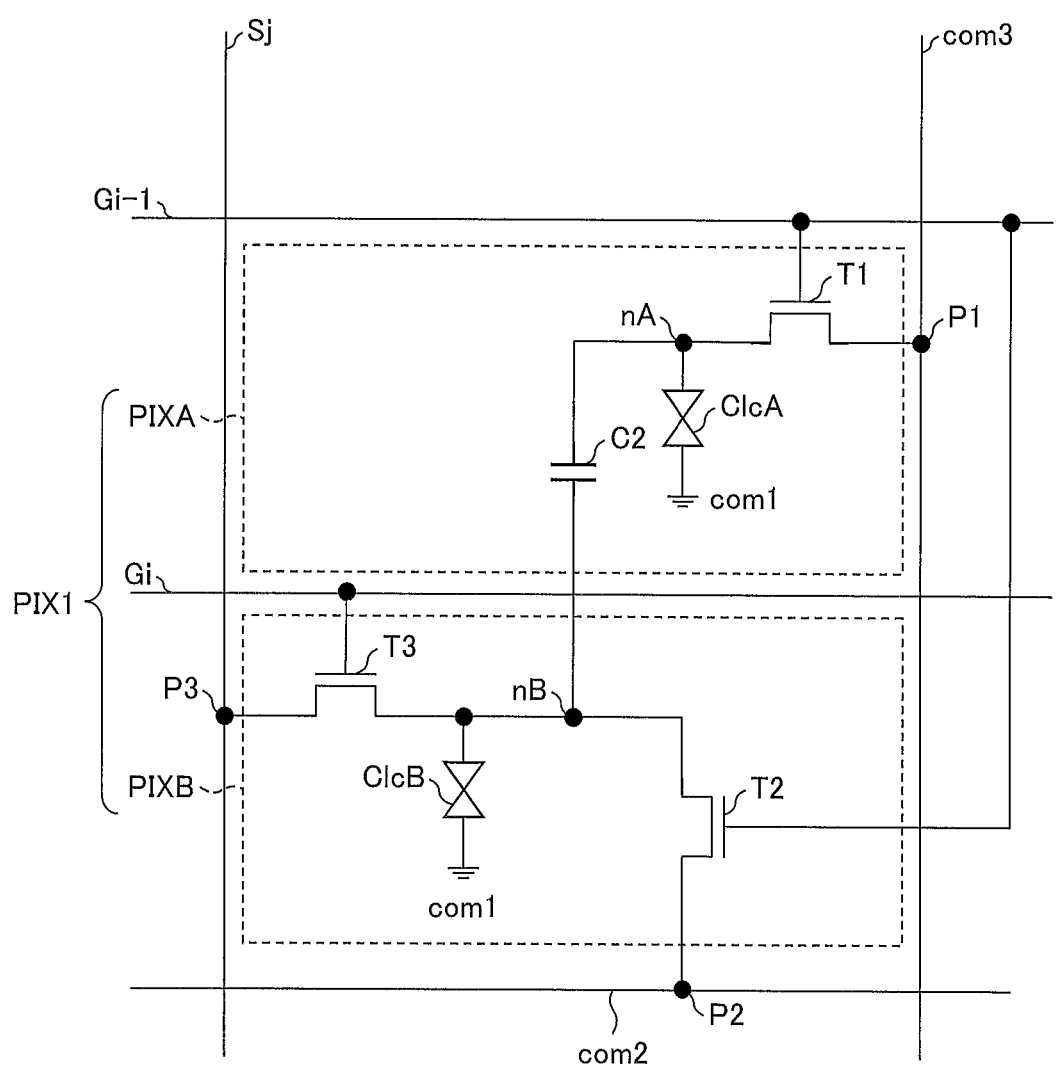
FIG. 16 is a circuit diagram illustrating a configuration of a modification of the pixel circuit of FIG. 1.

FIG. 15 is a cross-sectional view illustrating an amorphous silicon TFT that is currently used in a general liquid crystal television. The TFT includes a substrate 11, a gate electrode 12, a gate insulating film 13, an i-layer amorphous silicon layer 14, a n+ amorphous silicon layer 15, a source electrode 16/drain electrode 17, and a protective film 18 that are laminated in this order.

A parasitic capacitance Cgs occurs in a part where the gate electrode 12 and the source electrode 16 overlap each other, and a parasitic capacitance Cgd occurs in a part where the gate electrode 12 and the drain electrode 17 overlap each other. This causes the following problem. Specifically, at a timing at which electric potentials of the scanning lines G−1 and G1 change (especially at a timing at which electric potentials of the scanning lines G−1 and Gi change from VH to VL), electric potentials of the nodes nA and nB or electric potentials of the nodes nC and nD change. As a result, there is a possibility that the electric potentials of the nodes nA and nB or electric potentials of the nodes nC and nD cannot be set to desired electric potentials. However, in the pixel PIX1 of FIG. 1 and the pixel PIX2 of FIG. 8, this change in electric potentials is suppressed by incorporating the capacitor C1 into the circuit.

Figure 17:
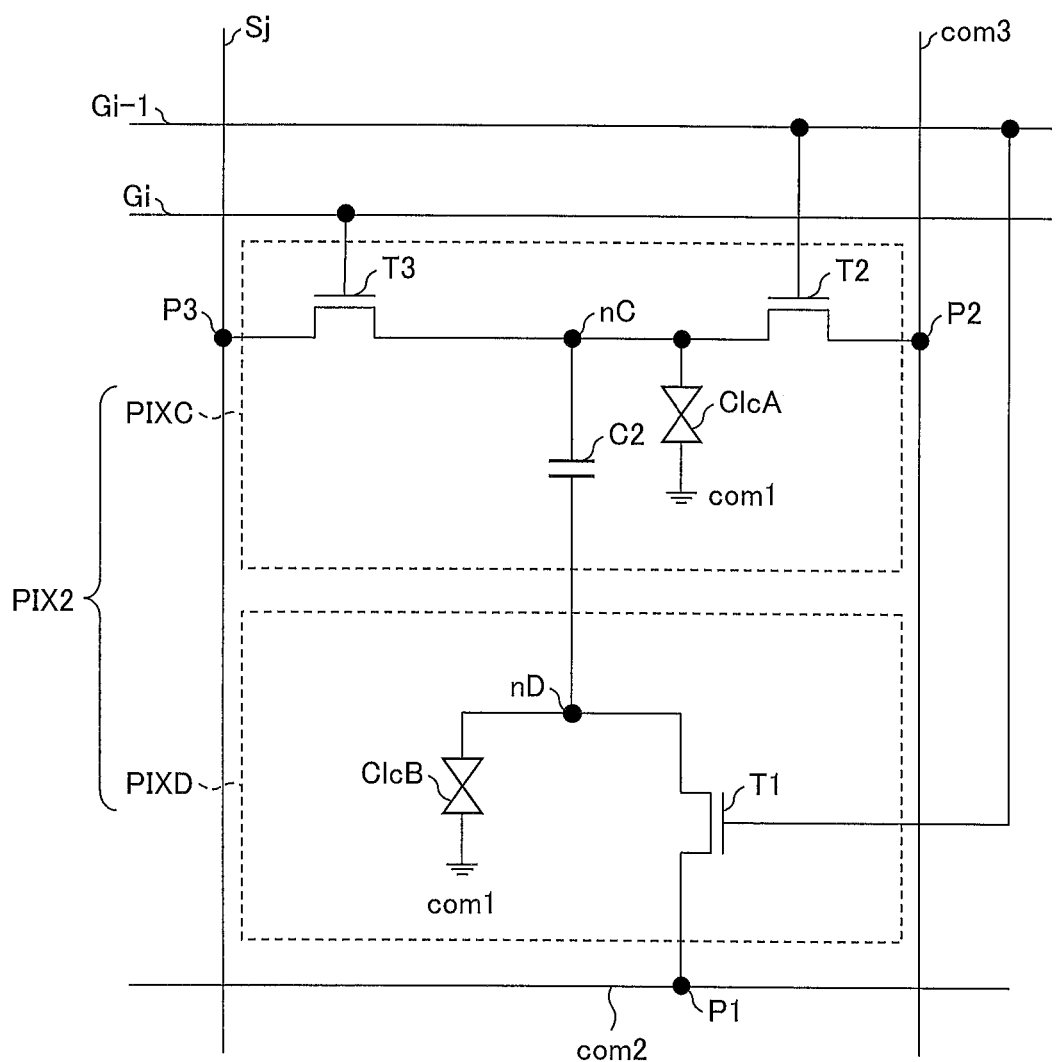
FIG. 17 is a circuit diagram illustrating a configuration of a modification of the pixel circuit of FIG. 8.
Figure 18:
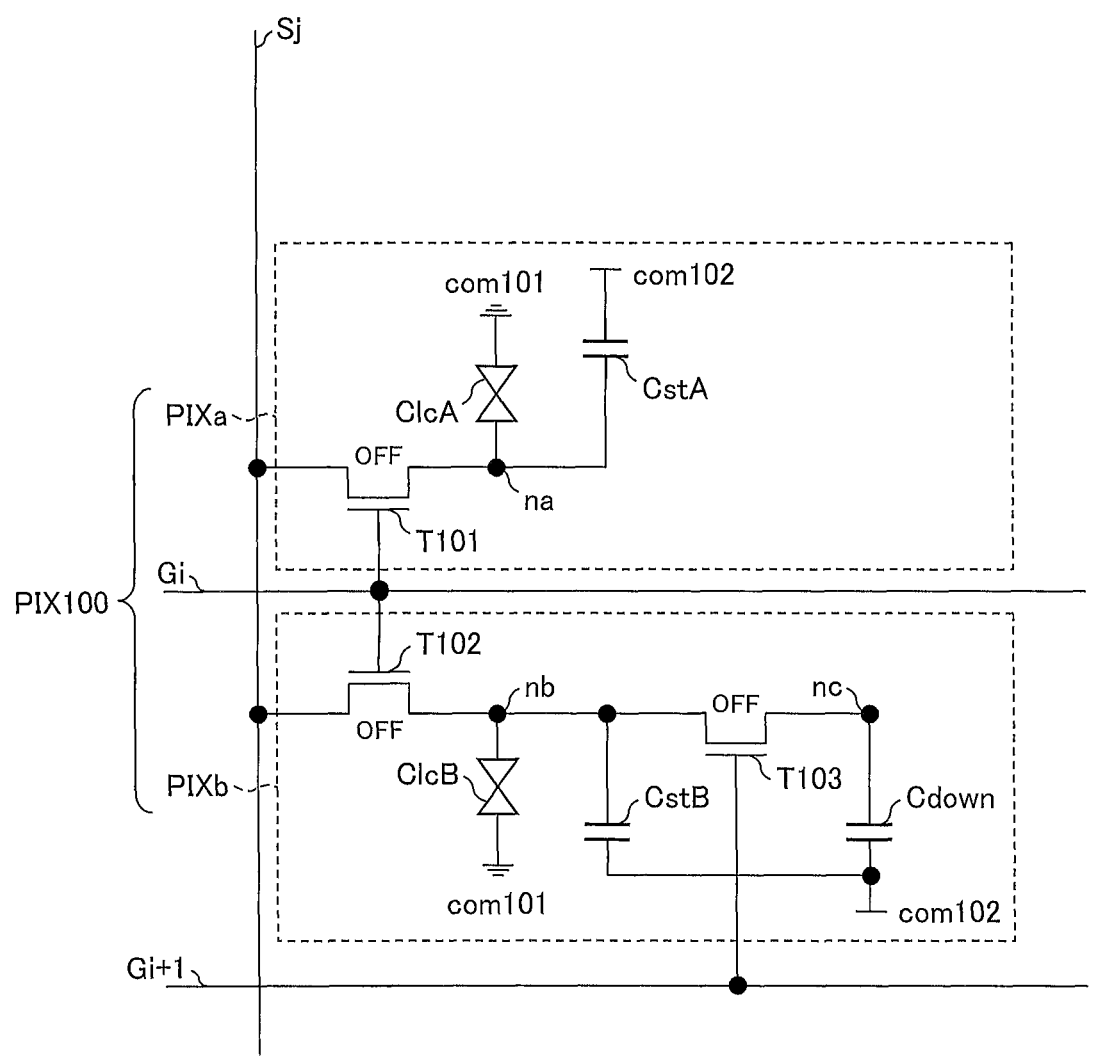
FIG. 18 illustrates a conventional art, and is a circuit diagram illustrating a configuration of a pixel.
Figure 19:
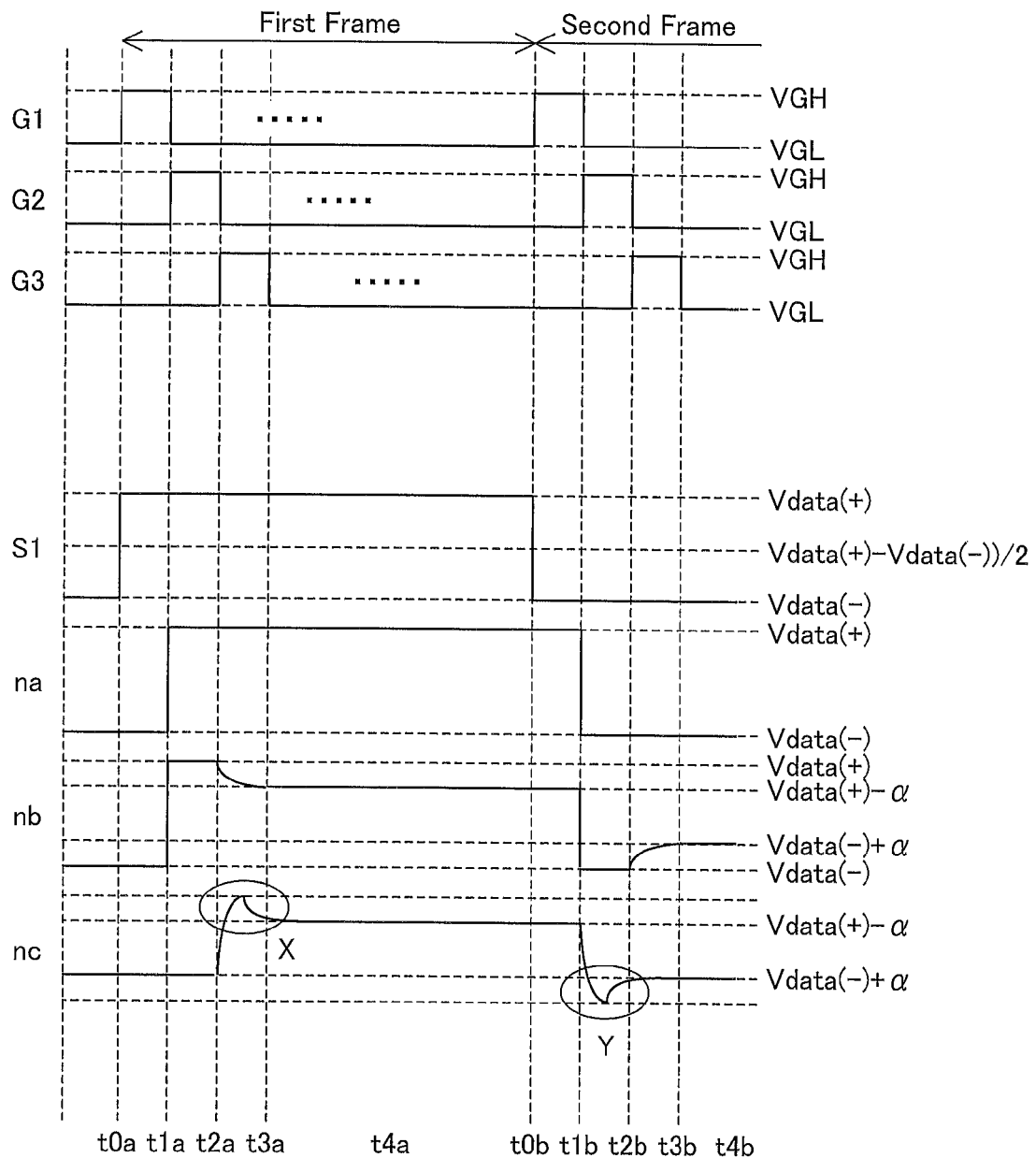
FIG. 19 is a timing chart explaining an operation of the pixel of FIG. 18.
Figure 20:
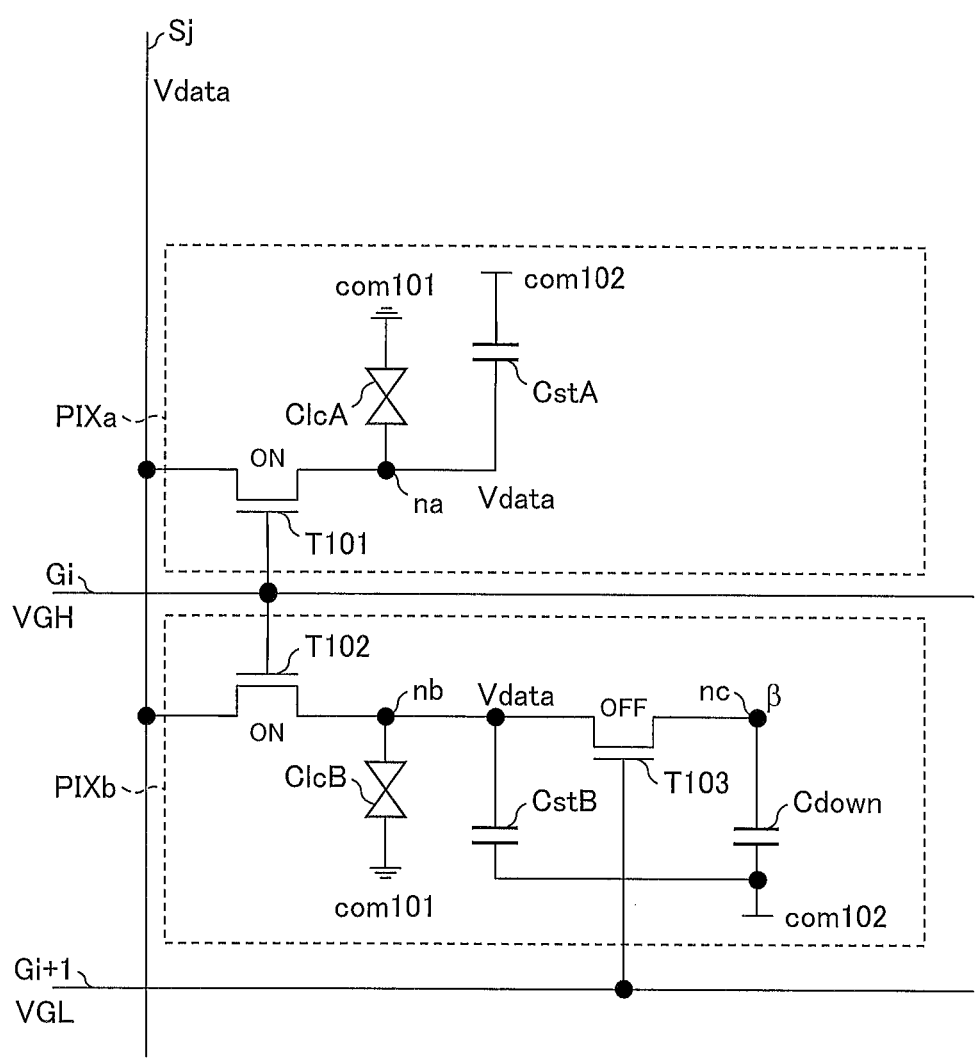
FIG. 20 is a circuit diagram illustrating a first state of the pixel which operates in accordance with the timing chart of FIG. 19.
Figure 21:
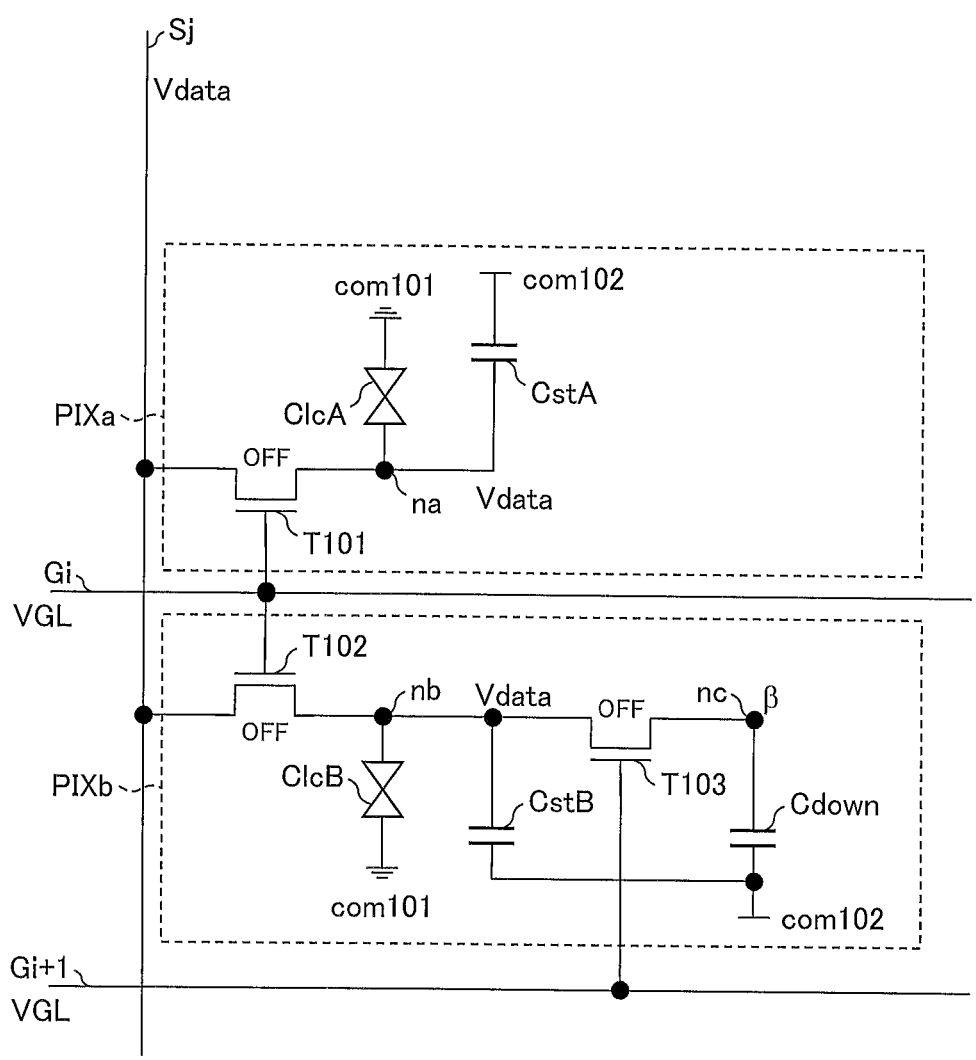
FIG. 21 is a circuit diagram illustrating a second state of the pixel which operates in accordance with the timing chart of FIG. 19.
Figure 22:
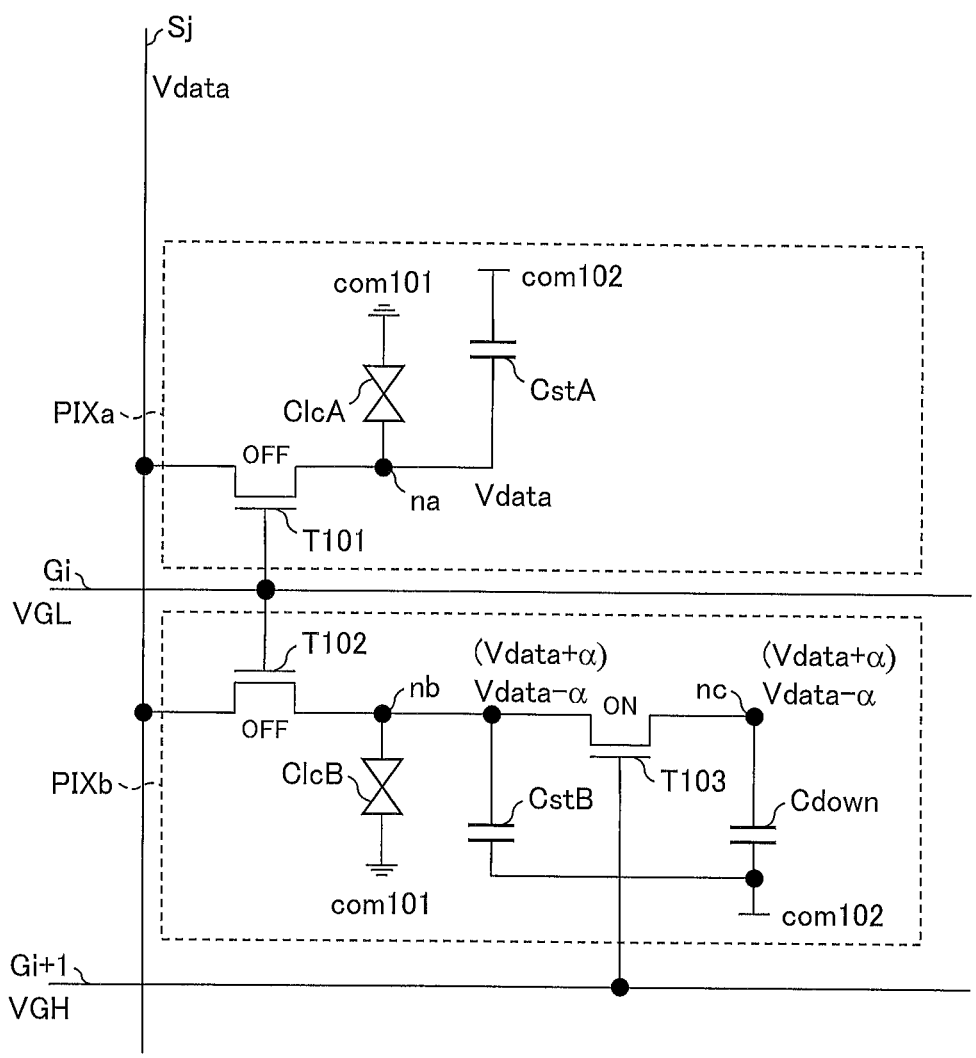
FIG. 22 is a circuit diagram illustrating a third state of the pixel which operates in accordance with the timing chart of FIG. 19.
Figure 23:
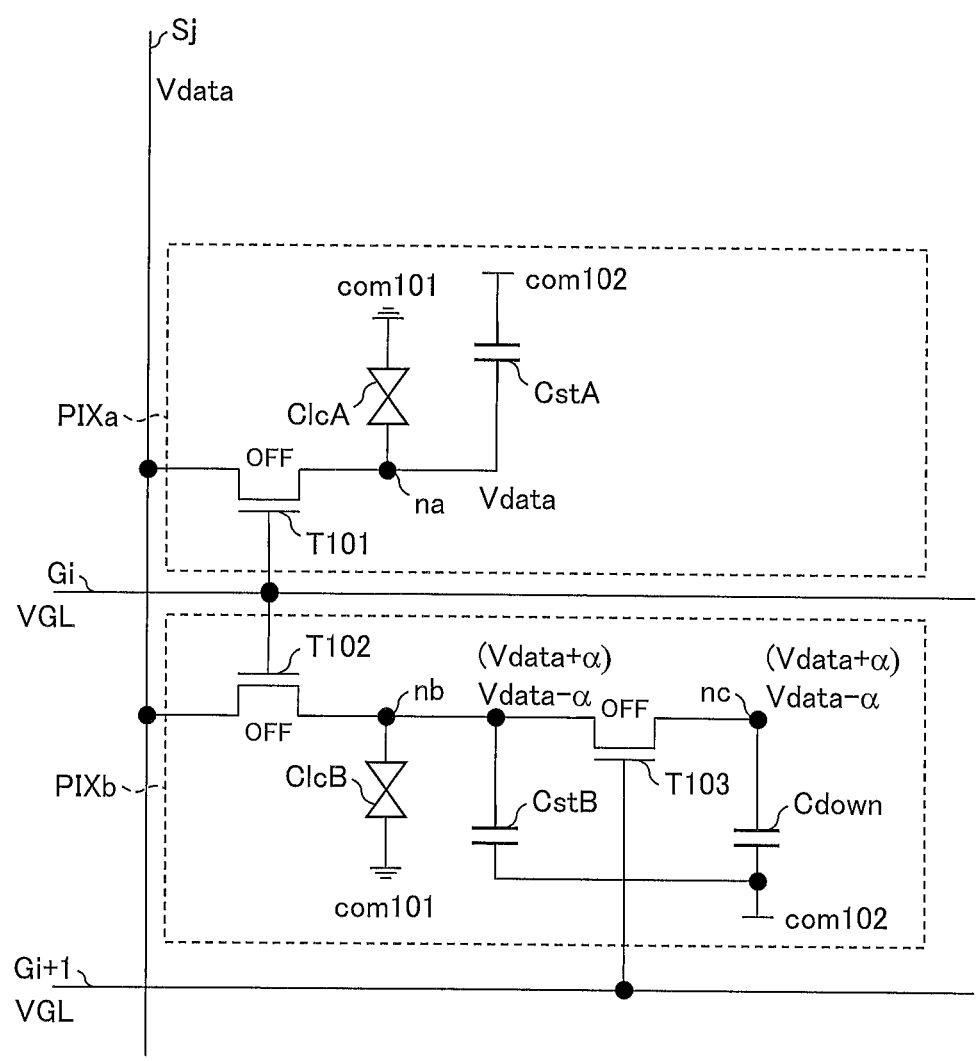
FIG. 23 is a circuit diagram illustrating a fourth state of the pixel which operates in accordance with the timing chart of FIG. 19.

However, a size of a TFT is becoming smaller every year due to improvement of TFT characteristics (especially mobility). Further, research and development of high-mobility TFTs, such as a microcrystalline silicon TFT and an oxide TFT, which replace the amorphous silicon TFT are vigorously conducted. Use of such TFTs allows a TFT size to be smaller than an amorphous silicon TFT. Since the parasitic capacitances Cgs and Cgd depend on a TFT size (channel length, channel width), use of a TFT of a smaller size can make the parasitic capacitances Cgs and Cgd smaller. In a case where the parasitic capacitances Cgs and Cgd become smaller, the change of the electric potentials can be sufficiently suppressed only by the liquid crystal capacitor components ClcA and ClcB. In a case where the parasitic capacitances Cgs and Cgd are small, a similar operation to the pixel PIX1 can be carried out even by using a pixel PIX1 having a configuration of FIG. 16 which is obtained by removing the capacitor C1 from the pixel PIX1 of FIG. 1. Further, a similar operation to the pixel PIX2 can be carried out even by using a pixel PIX2 having a configuration of FIG. 17 which is obtained by removing the capacitor C1 from the pixel PIX2 of FIG. 8. Note that an operation according to the configuration of FIG. 16 and an operation according to the configuration of FIG. 17 are almost similar to that of the pixel PIX1 of FIG. 1 and that of the pixel PIX2 of FIG. 8, respectively, and therefore are not explained in detail.

In the present embodiment, the first switching element, the second switching element, and the third switching element are TFTs which are MOS transistors (the term "MOS transistor" encompasses a silicon gate MOS structure) formed on an insulating substrate such as a glass substrate. However, the present invention is not limited to this. The first switching element, the second switching element, and the third switching element are not limited in particular, provided that they are voltage control type elements in which an output electric current is controlled by a control voltage applied to an electric current control terminal and in which the control voltage has a threshold voltage for determining presence or absence of an output electric current.

As described above, a pixel circuit of the present invention includes:

a first subpixel circuit; and a second subpixel circuit, the first subpixel circuit including a first display element, a first node to which an electric potential determining a display state of the first display element is applied, a first external connection terminal, and a first switching element connected between the first node and the first external connection terminal, the second subpixel circuit including a second display element, a second node to which an electric potential determining a display state of the second display element is applied, a second external connection terminal, a third external connection terminal, a second switching element connected between the second node and the second external connection terminal, and a third switching element connected between the second node and the third external connection terminal, the first node and the second node being connected to each other via a first capacitor.

According to the invention, first, the first switching element is turned on so that an electric potential can be applied from the first external connection terminal to the first node, and the second switching element is turned on so that an electric potential can be applied from the second external connection terminal to the second node. Next, the first switching element and the second switching element are turned off, and the third switching element is turned on so that another electric potential is applied from the third external connection terminal to the second node. This allows different electric potentials to be applied to the first node and the second node due to an effect of the connection via the first capacitor.

Consequently, the first display element and the second display element can be operated as display elements with different threshold voltages.

Before the third switch is turned on, there is a stage of applying an electric potential from the first external connection terminal to the first node and applying an electric potential from the second external connection terminal to the second node. Accordingly, an electric potential of the second node and an electric potential of the first node connected to the second node via the first capacitor do not undergo a great change when the third switching element is turned on so that another electric potential is applied from the third external connection terminal to the second node. Consequently, overshooting of electric potentials of the subpixel circuits can be suppressed to a small level.

It is thus possible to produce an effect that a pixel circuit which includes a plurality of subpixel circuits and which makes it possible to suppress overshooting of electric potentials of the subpixel circuits to a small level can be provided.

The pixel circuit of the present invention is arranged such that the first display element and the second display element are liquid crystal display elements, the first node is a pixel electrode of the first display element, and the second node is a pixel electrode of the second display element.

According to the invention, it is possible to produce an effect that overshooting of electric potentials of subpixel circuits, which conventionally remarkably appeared, can be suppressed to a small level in a pixel circuit using a liquid crystal display element.

The pixel circuit of the present invention is arranged such that a second capacitor connected in parallel with the second switching element is provided between the second node and the second external connection terminal.

According to the invention, it is possible to produce an effect that a change of the first node and the second node can be suppressed to a small level, which change is caused by a parasitic capacitance which occurs in a case where the first through third switching elements are transistors.

The pixel circuit of the present invention is arranged such that a second capacitor connected in parallel with the first switching element is provided between the first node and the first external connection terminal.

According to the invention, it is possible to produce an effect that a change of the first node and the second node can be suppressed to a small level, which change is caused by a parasitic capacitance which occurs in a case where the first through third switching elements are transistors.

A display device of the present invention includes:

a display region in which a pixel circuit as set forth in any one of claims 1 through 4 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, and the third external connection terminal being connected to the data line.

According to the invention, first, the first switching element is turned on so that a first reference electric potential can be applied from the first power supply to the first node, and the second switching element is turned on so that a second reference electric potential can be applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a display device including a pixel circuit which includes a plurality of subpixel circuits and which makes it possible to suppress overshooting of electric potentials of the subpixel circuits to a small level can be provided.

A display device of the present invention includes:

a display region in which a pixel circuit as set forth in claim 3 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being a constant electric potential common to all frames.

According to the invention, first, the first switching element is turned on so that a first reference electric potential can be applied from the first power supply to the first node, and the second switching element is turned on so that a second reference electric potential can be applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the second reference electric potential is a constant electric potential common to all frames and the first reference electric potential is alternately inverted between the first level and the second level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

The display device of the present invention is arranged such that the first level is higher than the second reference electric potential, and the second reference electric potential is higher than the second level, and the data electric potential is equal to or higher than the second reference electric potential in a frame in which the first reference electric potential is the first level, and the data electric potential is equal to or lower than the second reference electric potential in a frame in which the first reference electric potential is the second level.

The invention produces an effect that it is possible to provide an electric potential relationship which allows overshooting of an electric potential to be suppressed to a small level while carrying out AC driving of the first display element and the second display element.

A display device of the present invention includes:

a display region in which a pixel circuit as set forth in claim 4 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being alternately inverted between a third level and a fourth level for every frame.

According to the invention, first, the first switching element is turned on so that a first reference electric potential can be applied from the first power supply to the first node, and the second switching element is turned on so that a second reference electric potential can be applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the first reference electric potential is alternately inverted between the first level and the second level for every frame and the second reference electric potential is alternately inverted between the third level and the fourth level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

The display device of the present invention is arranged such that the first level and the third level are supplied in an identical frame, and the second level and the fourth level are supplied in an identical frame, an absolute value of the third level is larger than an absolute value of the first level, and an absolute value of the fourth level is larger than an absolute value of the second level, the data electric potential is equal to or lower than the third level in a frame in which the second reference electric potential is the third level, and the data electric potential is equal to or higher than the fourth level in a frame in which the second reference electric potential is the fourth level.

The invention produces an effect that it is possible to provide an electric potential relationship which allows overshooting of an electric potential to be suppressed to a small level while carrying out AC driving of the first display element and the second display element.

The display device of the present invention is arranged such that in a case where a scanning line is present in a row followed by a row in which the pixel circuit is present, the scanning line in the row followed by the row in which the pixel circuit is present is the first line.

According to the invention, the scanning line serves as the first line. This produces an effect that the number of wires can be reduced.

The display device of the present invention is arranged such that the first display element and the second display element are liquid crystal display elements, the data electric potential is an electric potential which determines light emission luminance which serves as the display states of the first display element and the second display element, and in each frame, in a state in which the first reference electric potential is applied to the first node, the first display element is in a display state which does not exceed a liquid crystal threshold state, and in a state in which the second reference electric potential is applied to the second node, the second display element is in a display state which does not exceed the liquid crystal threshold state.

According to the invention, in the above states, the first display element and the second display element are in a display state which does not exceed a liquid crystal threshold state. This allows an improvement of contrast of the display device. As a result, it is possible to provide a higher-quality display device.

A method of the present invention is a method for driving a display device including:

a display region in which a pixel circuit as set forth in any one of claims 1 through 4 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, and the third external connection terminal being connected to the data line, the method comprising the step of (a) writing the data electric potential into the pixel circuit, the step (a) including the steps of:

(b) causing the first line to turn on the first switching element and the second switching element so as to connect the first node to the first power supply and connect the second node to the second power supply;

(c) causing the first line to turn off the first switching element and the second switching element;

(d) causing the scanning line to turn on the third switching element so as to connect the second node to the data line to which the data electric potential is being supplied; and (e) causing the scanning line to turn off the third switching element.

According to the invention, the data electric potential is written into the pixel circuit as follows. First, the first switching element is turned on so that a first reference electric potential is applied from the first power supply to the first node, and the second switching element is turned on so that a second reference electric potential is applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a method for driving a display device including a pixel circuit which includes a plurality of subpixel circuits and which makes it possible to suppress overshooting of electric potentials of the subpixel circuits to a small level can be provided.

A method of the present invention is a method for driving a display device including:

a display region in which a pixel circuit as set forth in claim 3 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being a constant electric potential common to all frames, the method comprising the step of (a) writing the data electric potential into the pixel circuit, the step (a) including the steps of:

(b) causing the first line to turn on the first switching element and the second switching element so as to connect the first node to the first power supply and connect the second node to the second power supply;

(c) causing the first line to turn off the first switching element and the second switching element;

(d) causing the scanning line to turn on the third switching element so as to connect the second node to the data line to which the data electric potential is being supplied; and (e) causing the scanning line to turn off the third switching element.

According to the invention, the data electric potential is written into the pixel circuit as follows. First, the first switching element is turned on so that a first reference electric potential is applied from the first power supply to the first node, and the second switching element is turned on so that a second reference electric potential is applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the second reference electric potential is a constant electric potential common to all frames and the first reference electric potential is alternately inverted between the first level and the second level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a method for driving a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

In the method of the present invention for driving a display device the first level is higher than the second reference electric potential, and the second reference electric potential is higher than the second level, and the data electric potential is equal to or higher than the second reference electric potential in a frame in which the first reference electric potential is the first level, and the data electric potential is equal to or lower than the second reference electric potential in a frame in which the first reference electric potential is the second level.

The invention produces an effect that it is possible to provide an electric potential relationship which allows overshooting of an electric potential to be suppressed to a small level while carrying out AC driving of the first display element and the second display element.

A method of the present invention is a method for driving a display device including:

a display region in which a pixel circuit as set forth in claim 4 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being alternately inverted between a third level and a fourth level for every frame, the method including the step of (a) writing the data electric potential into the pixel circuit, the step (a) including the steps of:

(b) causing the first line to turn on the first switching element and the second switching element so as to connect the first node to the first power supply and connect the second node to the second power supply;

(c) causing the first line to turn off the first switching element and the second switching element;

(d) causing the scanning line to turn on the third switching element so as to connect the second node to the data line to which the data electric potential is being supplied; and (e) causing the scanning line to turn off the third switching element.

According to the invention, the data electric potential is written into the pixel circuit as follows. First, the first switching element is turned on so that a first reference electric potential is applied from the first power supply to the first node, and the second switching element is turned on so that a second reference electric potential is applied from the second power supply to the second node. Next, the first switching element and the second switching element are turned off, and the third switching element is turned on so that a data electric potential is applied from the data line to the second node. This allows different electric potentials to be applied to the first node and the second node due to an effect of the connection via the first capacitor.

Consequently, the first display element and the second display element can be operated as display elements with different threshold voltages. Since the first reference electric potential is alternately inverted between the first level and the second level for every frame and the second reference electric potential is alternately inverted between the third level and the fourth level for every frame, AC driving of the first display element and the second display element is also possible.

Before the third switch is turned on, in each frame, there is a stage of applying an electric potential from the first power supply to the first node via the first external connection terminal and applying an electric potential from the second power supply to the second node via the second external connection terminal. Accordingly, an electric potential of the second node and an electric potential of the first node connected to the second node via the first capacitor do not undergo a great change when the third switching element is turned on so that another electric potential is applied from the data line to the second node via the third external connection terminal. Consequently, overshooting of electric potentials of the subpixel circuits can be suppressed to a small level.

It is thus possible to produce an effect that a method for driving a display device including a pixel circuit which includes a plurality of subpixel circuits and which makes it possible to suppress overshooting of electric potentials of the subpixel circuits to a small level can be provided.

In addition, it is possible to produce an effect that a lifetime of the display device can be extended since AC driving of the first display element and the second display element is carried out.

In the method of the present invention for driving a display device, the first level and the third level are supplied in an identical frame, and the second level and the fourth level are supplied in an identical frame, an absolute value of the third level is larger than an absolute value of the first level, and an absolute value of the fourth level is larger than an absolute value of the second level, the data electric potential is equal to or lower than the third level in a frame in which the second reference electric potential is the third level, and the data electric potential is equal to or higher than the fourth level in a frame in which the second reference electric potential is the fourth level.

The invention produces an effect that it is possible to provide an electric potential relationship which allows overshooting of an electric potential to be suppressed to a small level while carrying out AC driving of the first display element and the second display element.

In the method of the present invention for driving a display device, the first display element and the second display element are liquid crystal display elements, the data electric potential is an electric potential which determines light emission luminance which serves as the display states of the first display element and the second display element, and in each frame, in a state in which the first reference electric potential is applied to the first node, the first display element is in a display state which does not exceed a liquid crystal threshold state, and in a state in which the second reference electric potential is applied to the second node, the second display element is in a display state which does not exceed the liquid crystal threshold state.

According to the invention, in the above states, the first display element and the second display element are in a display state which does not exceed a liquid crystal threshold state. This allows an improvement of contrast of a display device. As a result, it is possible to provide a higher-quality display device.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to an active matrix display device, especially a large-panel display device.

REFERENCE SIGNS LIST

1: Display device
PIX1, PIX2: Pixel (pixel circuit)
PIXA, PIXD: Subpixel (first subpixel circuit)
PIXB, PIXC: Subpixel (second subpixel circuit)
nA, nD: Node (first node)
nB, nC: Node (second node)
ClcA: Liquid crystal capacitor (first display element in Example 1, second display element in Example 2)
ClcB: Liquid crystal capacitor (second display element in Example 1, first display element in Example 2)
C1: Capacitor (second capacitor in Example 1, first capacitor in Example 2)
C2: Capacitor (first capacitor in Example 1, second capacitor in Example 2)
T1: Transistor (first switching element)

T2: Transistor (second switching element)
T3: Transistor (third switching element)
com2: Common electrode (second power supply in Example 1, first power supply in Example 2)
com3: Common electrode (first power supply in Example 1, second power supply in Example 2)
Vcs: Electric potential (second reference electric potential in Example 1, first reference electric potential in Example 2)
Vcs1: Electric potential (first reference electric potential in Example 2, first level)
Vcs2: Electric potential (first reference electric potential in Example 2, second level)
VH: Electric potential (first reference electric potential in Example 1, second reference electric potential in Example 2, third level)
VL: Electric potential (first reference electric potential in Example 1, second reference electric potential in Example 2, fourth level)
P1: Terminal (first external connection terminal)
P2: Terminal (second external connection terminal)
P3: Terminal (third external connection terminal)
Gi(1≤i≤n): Scanning line
G−1: Scanning line (first line)
Sj(1≤j≤m): Data line
Vdata: Electric potential (data electric potential)

What is claimed is:

1. A pixel circuit comprising:
a first subpixel circuit; and
a second subpixel circuit,
the first subpixel circuit including a first display element, a first node to which an electric potential determining a display state of the first display element is applied, a first external connection terminal, and a first switching element connected between the first node and the first external connection terminal,
the second subpixel circuit including a second display element, a second node to which an electric potential determining a display state of the second display element is applied, a second external connection terminal, a third external connection terminal, a second switching element connected between the second node and the second external connection terminal, and a third switching element connected between the second node and the third external connection terminal,
the first node and the second node being connected to each other via a first capacitor, wherein a second capacitor connected in parallel with the second switching element is provided between the second node and the second external connection terminal; and
at least one of the first capacitor and the second capacitor is directly connected to the respective one of the first and second switching elements.

2. The pixel circuit according to claim 1, wherein:
the first display element and the second display element are liquid crystal display elements,
the first node is a pixel electrode of the first display element, and
the second node is a pixel electrode of the second display element.

3. The pixel circuit according to claim 1 or 2, wherein a second capacitor connected in parallel with the first switching element is provided between the first node and the first external connection terminal.

4. A display device comprising:
a display region in which a pixel circuit as set forth in claim 3 is disposed in a matrix;
a data line for supplying a data electric potential to the pixel circuit;
a scanning line for turning on/off the third switching element;
a first line for turning on the first switching element and the second switching element in each frame in a period followed by a period in which the third switching element is turned on by the scanning line;
a first power supply for supplying a first reference electric potential in each frame; and
a second power supply for supplying a second reference electric potential different from the first reference electric potential in each frame,
the first external connection terminal being connected to the first power supply,
the second external connection terminal being connected to the second power supply,
the third external connection terminal being connected to the data line,
the first reference electric potential being alternately inverted between a first level and a second level for every frame, and
the second reference electric potential being alternately inverted between a third level and a fourth level for every frame.

5. The display device according to claim 4, wherein:
the first level and the third level are supplied in an identical frame, and the second level and the fourth level are supplied in an identical frame,
an absolute value of the third level is larger than an absolute value of the first level, and an absolute value of the fourth level is larger than an absolute value of the second level,
the data electric potential is equal to or lower than the third level in a frame in which the second reference electric potential is the third level, and the data electric potential is equal to or higher than the fourth level in a frame in which the second reference electric potential is the fourth level.

6. A method for driving a display device including:
a display region in which a pixel circuit as set forth in claim 3 is disposed in a matrix;
a data line for supplying a data electric potential to the pixel circuit;
a scanning line for turning on/off the third switching element;
a first line for turning on the first switching element and the second switching element in each frame in a period followed by a period in which the third switching element is turned on by the scanning line;
a first power supply for supplying a first reference electric potential in each frame; and
a second power supply for supplying a second reference electric potential different from the first reference electric potential in each frame,
the first external connection terminal being connected to the first power supply,
the second external connection terminal being connected to the second power supply,
the third external connection terminal being connected to the data line,
the first reference electric potential being alternately inverted between a first level and a second level for every frame, and
the second reference electric potential being alternately inverted between a third level and a fourth level for every frame, the method comprising the step of (a) writing the data electric potential into the pixel circuit, the step (a) including the steps of:

(b) causing the first line to turn on the first switching element and the second switching element so as to connect the first node to the first power supply and connect the second node to the second power supply;

(c) causing the first line to turn off the first switching element and the second switching element;

(d) causing the scanning line to turn on the third switching element so as to connect the second node to the data line to which the data electric potential is being supplied; and (e) causing the scanning line to turn off the third switching element.

7. The method according to claim 6, wherein:

the first level and the third level are supplied in an identical frame, and the second level and the fourth level are supplied in an identical frame, an absolute value of the third level is larger than an absolute value of the first level, and an absolute value of the fourth level is larger than an absolute value of the second level, the data electric potential is equal to or lower than the third level in a frame in which the second reference electric potential is the third level, and the data electric potential is equal to or higher than the fourth level in a frame in which the second reference electric potential is the fourth level.

8. A display device comprising:

a display region in which a pixel circuit as set forth in claim 1 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, and the third external connection terminal being connected to the data line.

9. The display device according to claim 8, wherein in a case where a scanning line is present in a row followed by a row in which the pixel circuit is present, the scanning line in the row followed by the row in which the pixel circuit is present is the first line.

10. The display device according to claim 8, wherein:

the first display element and the second display element are liquid crystal display elements, the data electric potential is an electric potential which determines light emission luminance which serves as the display states of the first display element and the second display element, and in each frame, in a state in which the first reference electric potential is applied to the first node, the first display element is in a display state which does not exceed a liquid crystal threshold state, and in a state in which the second reference electric potential is applied to the second node, the second display element is in a display state which does not exceed the liquid crystal threshold state.

11. A display device comprising:

a display region in which a pixel circuit as set forth in claim 1 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, the third external connection terminal being connected to the data line, the first reference electric potential being alternately inverted between a first level and a second level for every frame, and the second reference electric potential being a constant electric potential common to all frames.

12. The display device according to claim 11, wherein:

the first level is higher than the second reference electric potential, and the second reference electric potential is higher than the second level, and the data electric potential is equal to or higher than the second reference electric potential in a frame in which the first reference electric potential is the first level, and the data electric potential is equal to or lower than the second reference electric potential in a frame in which the first reference electric potential is the second level.

13. A method for driving a display device including:

a display region in which a pixel circuit as set forth in claim 1 is disposed in a matrix;

a data line for supplying a data electric potential to the pixel circuit;

a scanning line for turning on/off the third switching element;

a first line for turning on the first switching element and the second switching element in each frame in a period followed by a period in which the third switching element is turned on by the scanning line;

a first power supply for supplying a first reference electric potential in each frame; and a second power supply for supplying a second reference electric potential different from the first reference electric potential in each frame, the first external connection terminal being connected to the first power supply, the second external connection terminal being connected to the second power supply, and the third external connection terminal being connected to the data line, the method comprising the step of (a) writing the data electric potential into the pixel circuit, the step (a) including the steps of:

(b) causing the first line to turn on the first switching element and the second switching element so as to connect the first node to the first power supply and connect the second node to the second power supply;
(c) causing the first line to turn off the first switching element and the second switching element;
(d) causing the scanning line to turn on the third switching element so as to connect the second node to the data line to which the data electric potential is being supplied; and
(e) causing the scanning line to turn off the third switching element.

14. The method according to claim 13, wherein:
the first display element and the second display element are liquid crystal display elements,
the data electric potential is an electric potential which determines light emission luminance which serves as the display states of the first display element and the second display element, and
in each frame, in a state in which the first reference electric potential is applied to the first node, the first display element is in a display state which does not exceed a liquid crystal threshold state, and in a state in which the second reference electric potential is applied to the second node, the second display element is in a display state which does not exceed the liquid crystal threshold state.

15. A method for driving a display device including:
a display region in which a pixel circuit as set forth in claim 1 is disposed in a matrix;
a data line for supplying a data electric potential to the pixel circuit;
a scanning line for turning on/off the third switching element;
a first line for turning on the first switching element and the second switching element in each frame in a period followed by a period in which the third switching element is turned on by the scanning line;
a first power supply for supplying a first reference electric potential in each frame; and
a second power supply for supplying a second reference electric potential different from the first reference electric potential in each frame,
the first external connection terminal being connected to the first power supply,
the second external connection terminal being connected to the second power supply,
the third external connection terminal being connected to the data line,
the first reference electric potential being alternately inverted between a first level and a second level for every frame, and
the second reference electric potential being a constant electric potential common to all frames,
the method comprising the step of (a) writing the data electric potential into the pixel circuit,
the step (a) including the steps of:
(b) causing the first line to turn on the first switching element and the second switching element so as to connect the first node to the first power supply and connect the second node to the second power supply;
(c) causing the first line to turn off the first switching element and the second switching element;
(d) causing the scanning line to turn on the third switching element so as to connect the second node to the data line to which the data electric potential is being supplied; and
(e) causing the scanning line to turn off the third switching element.

16. The method according to claim 15, wherein:
the first level is higher than the second reference electric potential, and the second reference electric potential is higher than the second level, and
the data electric potential is equal to or higher than the second reference electric potential in a frame in which the first reference electric potential is the first level, and the data electric potential is equal to or lower than the second reference electric potential in a frame in which the first reference electric potential is the second level.

* * * * *